(12) United States Patent
Dixon et al.

(10) Patent No.: US 12,408,763 B2
(45) Date of Patent: Sep. 9, 2025

(54) CONTROLLING A BED REMOTELY

(71) Applicant: Sleep Number Corporation, Minneapolis, MN (US)

(72) Inventors: Jessica Lynn Dixon, Ramsey, MN (US); Stacy Stusynski, Blaine, MN (US); Natalie Negus, Minneapolis, MN (US); Jeffrey Scott Hartzler, Minneapolis, MN (US); Cory Lee Grabinger, Maple Grove, MN (US)

(73) Assignee: Sleep Number Corporation, Minneapolis, MN (US)

( * ) Notice: Subject to any disclaimer, the term of this patent is extended or adjusted under 35 U.S.C. 154(b) by 683 days.

(21) Appl. No.: 17/523,349

(22) Filed: Nov. 10, 2021

(65) Prior Publication Data

US 2023/0142604 A1 May 11, 2023

(51) Int. Cl.
*A47C 31/00* (2006.01)
*G06F 3/044* (2006.01)
*G08C 17/02* (2006.01)

(52) U.S. Cl.
CPC ............ *A47C 31/008* (2013.01); *G06F 3/044* (2013.01); *G08C 17/02* (2013.01); *G08C 2201/30* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 6,507,423 B1 * | 1/2003 | Chen | H04B 10/1141 |
| | | | 455/343.2 |
| 8,444,558 B2 | 5/2013 | Young et al. | |
| 8,672,853 B2 | 3/2014 | Young | |
| 8,984,687 B2 | 3/2015 | Stusynski et al. | |
| 9,182,750 B2 * | 11/2015 | Rawls-Meehan | A47C 31/008 |
| 9,370,457 B2 | 6/2016 | Nunn et al. | |
| 9,392,879 B2 | 7/2016 | Nunn et al. | |
| 9,445,751 B2 | 9/2016 | Young et al. | |
| 9,495,768 B1 * | 11/2016 | Elliott | G09G 5/343 |
| 9,504,416 B2 | 11/2016 | Young et al. | |
| 9,510,688 B2 | 12/2016 | Nunn et al. | |
| 9,524,633 B2 | 12/2016 | Mann et al. | |
| 9,635,953 B2 | 5/2017 | Nunn et al. | |
| 9,757,861 B2 * | 9/2017 | Hong | B25J 9/1689 |

(Continued)

FOREIGN PATENT DOCUMENTS

WO  WO-2015199787 A1 * 12/2015 ............. G01B 7/003

OTHER PUBLICATIONS

U.S. Appl. No. 16/719,177, filed Dec. 18, 2018, Nunn et al.

(Continued)

*Primary Examiner* — Carlos Garcia
(74) *Attorney, Agent, or Firm* — Fish & Richardson P.C.

(57) ABSTRACT

A remote control for a bed system is described. The remote control includes a case, a display screen, a first input area, at least one capacitive button, and a communications module. The case has a base surface, a display surface, and an upper surface. The display screen is on the display surface. The first input area is on the display surface. At least one capacitive button is separate from the first input area. The communication module allows communication between the remote control and a separate controller of the bed system.

20 Claims, 26 Drawing Sheets

(56) References Cited

U.S. PATENT DOCUMENTS

| | | | |
|---|---|---|---|
| 9,770,114 | B2 | 9/2017 | Brosnan et al. |
| 9,844,275 | B2 | 12/2017 | Nunn et al. |
| 9,931,085 | B2 | 4/2018 | Young et al. |
| 9,984,516 | B2 * | 5/2018 | Geerlings ................ G07C 9/30 |
| 10,058,467 | B2 | 8/2018 | Stusynski et al. |
| 10,092,242 | B2 | 10/2018 | Nunn et al. |
| 10,149,549 | B2 | 12/2018 | Erko et al. |
| 10,182,661 | B2 | 1/2019 | Nunn et al. |
| 10,194,753 | B2 * | 2/2019 | Fleury ................ A47C 31/008 |
| 10,201,234 | B2 | 2/2019 | Nunn et al. |
| 10,251,490 | B2 | 4/2019 | Nunn et al. |
| 10,339,741 | B2 * | 7/2019 | Geerlings .............. G08C 17/02 |
| 10,342,358 | B1 | 7/2019 | Palashewski et al. |
| 10,424,192 | B2 | 9/2019 | Mann et al. |
| 10,441,086 | B2 | 10/2019 | Nunn et al. |
| 10,441,087 | B2 | 10/2019 | Karschnik et al. |
| 10,448,749 | B2 | 10/2019 | Palashewski et al. |
| 10,492,969 | B2 | 12/2019 | Stusynski et al. |
| 10,621,803 | B2 * | 4/2020 | Geerlings .......... G07C 9/00857 |
| 10,632,032 | B1 | 4/2020 | Stusynski et al. |
| 10,646,050 | B2 | 5/2020 | Nunn et al. |
| 10,674,832 | B2 | 6/2020 | Brosnan et al. |
| 10,694,607 | B1 * | 6/2020 | Xu ........................ H05B 45/22 |
| 10,716,512 | B2 | 7/2020 | Erko et al. |
| 10,729,255 | B2 | 8/2020 | Erko et al. |
| 10,736,432 | B2 | 8/2020 | Brosnan et al. |
| 10,750,875 | B2 | 8/2020 | Palashewski et al. |
| 10,827,846 | B2 | 11/2020 | Karschnik et al. |
| 10,881,219 | B2 | 1/2021 | Nunn et al. |
| 10,957,335 | B2 | 3/2021 | Demirli et al. |
| 10,959,535 | B2 | 3/2021 | Karschnik et al. |
| D916,745 | S | 4/2021 | Stusynski et al. |
| 10,980,351 | B2 | 4/2021 | Nunn et al. |
| 11,096,849 | B2 | 8/2021 | Stusynski et al. |
| 11,122,909 | B2 | 9/2021 | Palashewski et al. |
| 11,160,683 | B2 | 11/2021 | Nunn et al. |
| 11,488,519 | B2 * | 11/2022 | Hyeon ..................... G09G 3/32 |
| 2006/0187195 | A1 * | 8/2006 | Chung .................... G09G 5/10 345/156 |
| 2008/0077020 | A1 | 3/2008 | Young et al. |
| 2010/0170043 | A1 | 7/2010 | Young et al. |
| 2011/0144455 | A1 | 6/2011 | Young et al. |
| 2011/0277242 | A1 * | 11/2011 | Dionne ................ A61G 7/0524 5/613 |
| 2013/0239324 | A1 * | 9/2013 | Mossbeck ............ A47C 20/041 29/428 |
| 2013/0289770 | A1 * | 10/2013 | Rawls-Meehan .... A47C 20/041 700/275 |
| 2013/0322846 | A1 * | 12/2013 | Ferren ................... G06F 3/0482 386/234 |
| 2014/0059768 | A1 * | 3/2014 | Lemire ................. A61G 7/0527 5/611 |
| 2014/0268628 | A1 * | 9/2014 | Mann ..................... G08C 17/02 361/752 |
| 2014/0277822 | A1 | 9/2014 | Nunn et al. |
| 2015/0023650 | A1 * | 1/2015 | Austin ............... H04N 21/4728 386/241 |
| 2015/0026896 | A1 * | 1/2015 | Fleury .................. A47C 27/082 5/713 |
| 2015/0228132 | A1 * | 8/2015 | Geerlings .............. G08C 17/02 340/5.22 |
| 2016/0015184 | A1 | 1/2016 | Nunn et al. |
| 2016/0120740 | A1 * | 5/2016 | Rawls-Meehan .... A47C 31/008 601/49 |
| 2016/0367039 | A1 | 12/2016 | Young et al. |
| 2017/0065220 | A1 | 3/2017 | Young et al. |
| 2017/0112716 | A1 * | 4/2017 | Rawls-Meehan ........................... A61H 23/0263 |
| 2017/0128001 | A1 | 5/2017 | Torre et al. |
| 2017/0143269 | A1 | 5/2017 | Young et al. |
| 2019/0053761 | A1 | 2/2019 | Torre et al. |
| 2019/0069840 | A1 | 3/2019 | Young et al. |
| 2019/0200069 | A1 * | 6/2019 | Maier .................. G06F 3/04895 |
| 2019/0200777 | A1 | 7/2019 | Demirli et al. |
| 2019/0201265 | A1 | 7/2019 | Sayadi et al. |
| 2019/0201266 | A1 | 7/2019 | Sayadi et al. |
| 2019/0201267 | A1 | 7/2019 | Demirli et al. |
| 2019/0201268 | A1 | 7/2019 | Sayadi et al. |
| 2019/0201270 | A1 | 7/2019 | Sayadi et al. |
| 2019/0201271 | A1 | 7/2019 | Grey et al. |
| 2019/0328146 | A1 | 10/2019 | Palashewski et al. |
| 2019/0328147 | A1 | 10/2019 | Palashewski et al. |
| 2019/0357696 | A1 | 11/2019 | Palashewski et al. |
| 2020/0020223 | A1 | 1/2020 | Mann et al. |
| 2020/0098214 | A1 * | 3/2020 | Geerlings .............. G08C 17/02 |
| 2020/0315367 | A1 | 10/2020 | Demirli et al. |
| 2020/0336010 | A1 | 10/2020 | Holmvik et al. |
| 2020/0359807 | A1 | 11/2020 | Brosnan et al. |
| 2020/0367663 | A1 | 11/2020 | Nunn et al. |
| 2020/0405070 | A1 | 12/2020 | Palashewski et al. |
| 2020/0405240 | A1 | 12/2020 | Palashewski et al. |
| 2021/0000261 | A1 | 1/2021 | Erko et al. |
| 2021/0034989 | A1 | 2/2021 | Palashewski et al. |
| 2021/0045541 | A1 | 2/2021 | Nunn et al. |
| 2021/0068552 | A1 | 3/2021 | Palashewski et al. |
| 2021/0112992 | A1 | 4/2021 | Nunn et al. |
| 2022/0018050 | A1 * | 1/2022 | Bernardino ............. D06F 23/02 |
| 2023/0142604 | A1 * | 5/2023 | Dixon .................... G06F 3/044 5/616 |

OTHER PUBLICATIONS

U.S. Appl. No. 17/091,094, filed Nov. 6, 2020, Karschnik et al.
U.S. Appl. No. 17/189,618, filed Mar. 2, 2021, Stusynski.
U.S. Appl. No. 17/207,149, filed Mar. 19, 2021, Demirli et al.
U.S. Appl. No. 17/216,297, filed Mar. 29, 2021, Karschnik et al.
U.S. Appl. No. 17/379,460, filed Jul. 19, 2021, Stusynski et al.
U.S. Appl. No. 17/476,093, filed Sep. 15, 2021, Nunn et al.
U.S. Appl. No. 17/479,907, filed Sep. 20, 2021, Palashewski et al.
U.S. Appl. No. 29/676,117, filed Jan. 8, 2019, Stusynski et al.
U.S. Appl. No. 29/776,258, filed Mar. 29, 2021, Stusynski et al.
U.S. Appl. No. 29/777,084, filed Apr. 2, 2021, Stusynski et al.
U.S. Appl. No. 29/814,835, filed Nov. 9, 2021, Dixon et al.

* cited by examiner

CONTROLLING A BED REMOTELY

The present document relates to control of a consumer device such as an airbed.

BACKGROUND

In general, a bed is a piece of furniture used as a location to sleep or relax. Many modern beds include a soft mattress on a bed frame. The mattress may include springs, foam material, and/or an air chamber to support the weight of one or more occupants.

SUMMARY

An example implementation of the subject matter described within this disclosure is a bed system with the following features. Implementations can include any, all, or none of the following features.

Implementations of the present disclosure include a remote control for a bed system. The remote control includes a case, a display screen, a first input area, at least one capacitive button, and a communication module. The case has a base surface, a display surface, and an upper surface. The display screen is on the display surface. The first input area is on the display surface. At least one capacitive button is separate from the first input area. The communication module allows communication between the remote control and a separate controller of the bed system.

In some implementations, a portion of the case is metallic. In some cases, the portion of the case is capacitively sensitive and the remote control wakes responsive to a signal from the portion of the case that is capacitively sensitive.

In some implementations, the first input area includes a direction pad and a selection pad.

In some implementations, the remote control further includes a slider switch on the upper surface. The slider switch toggles between a first position and a second position. In some cases, the slider switch adjusts an interface displayed on the display screen to a first side of a bed when the slider switch is in the first position and a second side of the bed when the slider switch is in the second position.

In some implementations, the remote control is wirelessly coupled to the separate controller.

In some implementations, the separate controller is a bed controller configured to control pressure, articulation, temperature, or light level of the bed system.

In some implementations, the remote control pings the separate controller upon waking, receives a state from the separate controller, and displays an interface on the display screen responsive to the received state.

In some implementations, the capacitive button is between the display screen and the first input area.

In some implementations, the base surface is sized to allow the remote control to rest in a vertical position.

In some implementations, the base surface is substantially triangular.

In some implementations, the remote control of further includes a light sensor to receive ambient light and produce a light signal representative of an ambient light level.

In some implementations, the remote control adjusts a brightness of the display screen or the first input area responsive to the light signal.

Further implementations of the present disclosure include a method of operating a bed system having a remote control. The method includes fetching, by the remote control, a state of a bed from a bed controller that is physically separate from the remote control. The method includes displaying an interface on a screen of the remote control responsive to the fetched state.

In some implementations, the method further includes waking the remote control responsive to receiving a signal from a capacitive surface of the remote control, the signal being indicative of a touch by a user.

In some implementations, fetching includes wirelessly communicating between the remote control and the bed controller.

In some implementations, receiving a response includes the remote control receiving an indication of a new state and displaying an interface includes displaying an interface appropriate for the new state. In some cases, upon waking the remote control, receiving a response includes the remote control receiving an indication of no change in state since a previous fetch and displaying an interface includes displaying a last used interface.

In some implementations, the method further includes transmitting, by the remote control, a command signal to the bed to change the state of the bed from the state to a new state. The method further includes receiving, by the bed controller, the command signal to change the state of the bed from the state to the new state. The method further includes adjusting, by the bed controller, the state of the bed based on the command signal. The method further includes transmitting, by the bed controller, a signal representing the new state to the remote control. The method further includes, receiving, by the remote control, the signal representing the new state of the bed. The method further includes displaying, by the remote control, the new state of the bed on the screen of the remote control.

Further implementations of the present disclosure include a bed control system. The bed control system includes a bed controller and a remote control. The bed controller controls functions of a bed. The remote control is physically separate from the bed controller. The remote control is wirelessly coupled to the bed controller. The remote control includes a case having a base surface, a display surface, and an upper surface. A portion of the case is capacitively sensitive. The bed controller wakes responsive to a signal from the case. The remote control includes a display screen on the display surface. The remote control includes an input area on the display surface.

In some implementations, the remote control of the bed control system further includes a capacitive button separate from the input area. The capacitive button is between the display screen and the input area.

In some implementations, the remote control of the bed control system further includes a slider switch on the upper surface which toggles between a first position and a second position.

In some implementations, the base surface of the remote control is sized to allow the remote control to rest in a vertical position.

In some implementations, the base surface of the remote control is substantially triangular.

In some implementations, the remote control further includes a light sensor to receive ambient light and produce a light signal representative of an ambient light level. In some cases, the bed controller adjusts a brightness of the display screen and the input area responsive to the light signal.

Further implementations of the present disclosure include a remote control for a bed interface. The remote control includes a case, a display screen, an input area, and a light sensor. The case has a base surface, a display surface, and an upper surface. The display screen is on the display surface. The input area on the display surface. The light sensor receives ambient light and produces a light signal representative of an ambient light level.

In some implementations, the remote control is operatively coupled to the display screen and the light sensor. The remote control adjusts a brightness of the display screen and the input area responsive to the light signal.

Other features, aspects and potential advantages will be apparent from the accompanying description and figures.

DESCRIPTION OF DRAWINGS

Like reference symbols in the various drawings indicate like elements.

DETAILED DESCRIPTION

This disclosure relates to controlling a bed remotely by a remote control for the bed. The remote control has a case with a base surface, a display surface, and an upper surface. A display screen is on the display surface. A first input area is also on the display surface. The remote control has at least one capacitive button separate from the first input area. The remote control includes a communications module to communicate between the remote control and a separate controller of the bed.

In some embodiments, a bed system is operated by the remote control. A state of a bed is fetched, by the remote control, from a bed controller that is physically separate from the remote control. An interface is displayed on a screen of the remote control responsive to the fetched state.

In some embodiments, a bed control system includes a bed controller to control functions of a bed. The bed control system includes a remote control physically separate from the bed controller. The remote control is wirelessly coupled to the bed controller. The remote control includes a case. The case includes a base surface, a display surface, and an upper surface. A portion of the case is capacitively sensitive. The bed controller wakes responsive to a signal from the capacitively sensitive case. The bed control system includes a display screen on the display surface and a first input area on the display surface.

Example Airbed Hardware

Figure 1:
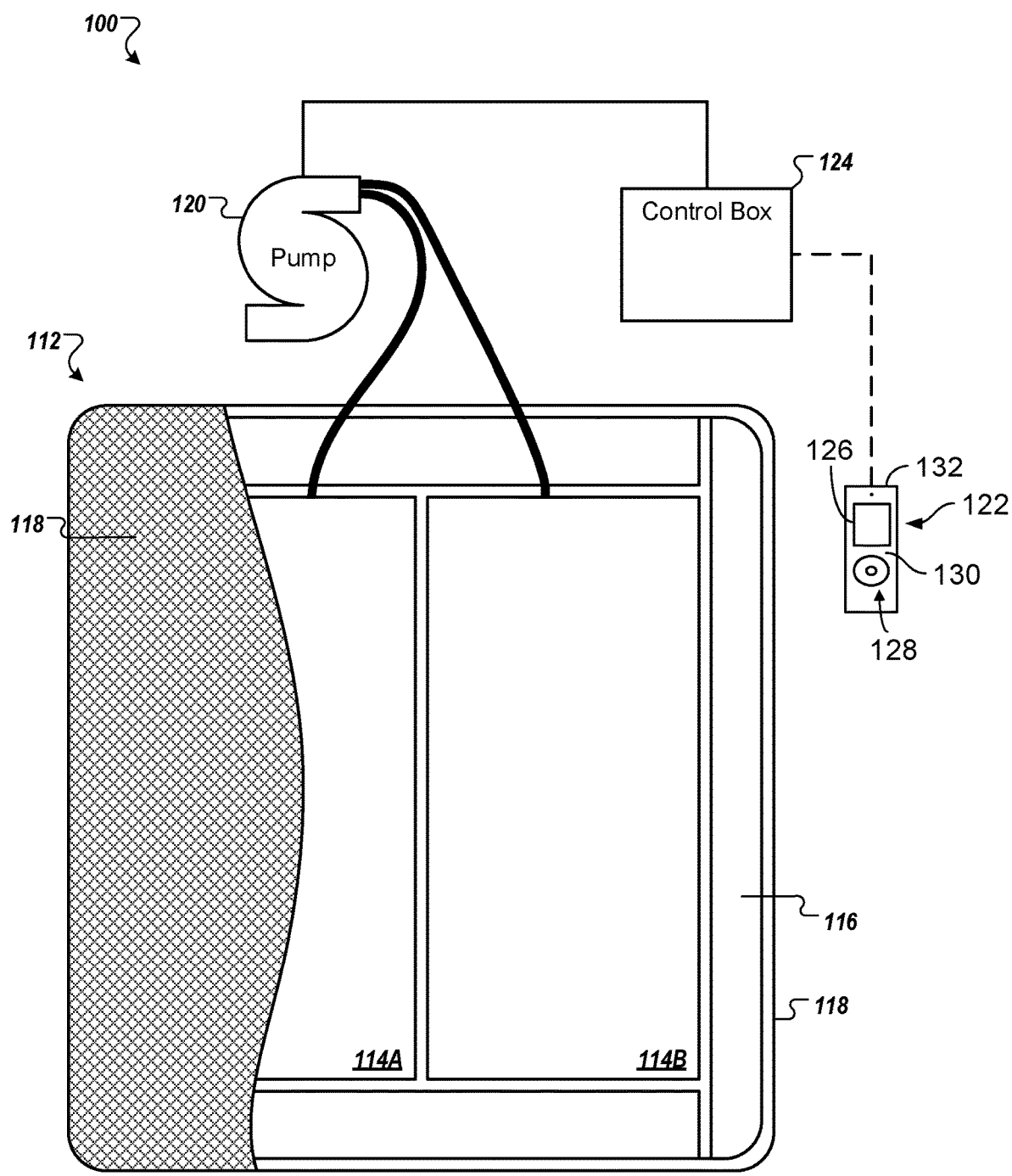
FIG. 1 shows an example air bed system.

FIG. 1 shows an example air bed system 100 that includes a bed 112. The bed 112 includes at least one air chamber 114 surrounded by a resilient border 116 and encapsulated by bed ticking 118. The resilient border 116 can comprise any suitable material, such as foam.

As illustrated in FIG. 1, the bed 112 can be a two chamber design having first and second fluid chambers, such as a first air chamber 114A and a second air chamber 114B. In alternative embodiments, the bed 112 can include chambers for use with fluids other than air that are suitable for the application. In some embodiments, such as single beds or kids' beds, the bed 112 can include a single air chamber 114A or 114B or multiple air chambers 114A and 114B. First and second air chambers 114A and 114B can be in fluid communication with a pump 120. The pump 120 can be in electrical communication with a remote control 122 via control box 124. The control box 124 can include a wired or wireless communications interface for communicating with one or more devices, including the remote control 122. The control box 124 can be configured to operate the pump 120 to cause increases and decreases in the fluid pressure of the first and second air chambers 114A and 114B based upon commands input by a user using the remote control 122. In some implementations, the control box 124 is integrated into a housing of the pump 120.

The remote control 122 can include a display 126, a first input area 128, a capacitive button 130, and a slider switch 132. The first input area 128, the capacitive button 130, and the slider switch 132 can be used to control features of the bed 112, such as firmness, articulation, temperature, a lighting level, and/or other features of the bed 112. For example, when the bed 112 is divided into separate portions such as a head section, body section, and a foot section (not shown), articulation can include raising, lowering, or angling one or more of the head section, the body section, or the foot section relative to the other sections. For example, when the bed 112 has a massage assembly (not shown) to massage the user, articulating can include operating the massage assembly to massage the user. The first input area 128 can by a physical control (e.g., switch or button) or an input control displayed on display 126. The slider switch 132 can control which side of the bed 112 is displayed and/or controlled on the screen 126. Alternatively, separate remote control units can be provided for each air chamber and can each include the ability to control multiple air chambers. The capacitive button 130 can be one or more capacitive buttons 130. The capacitive buttons 130 can be positioned next to one another or separate. In some implementations, the remote controller 122 case itself can include capacitive sensing such that the controller 122 can wake up when the user touches the remote controller 122, movement of the slider switch 132, or the user pressing the first input area 128. Adjusting the pressure within the selected air chamber can cause a corresponding adjustment to the firmness of the respective air chamber.

Figure 2:
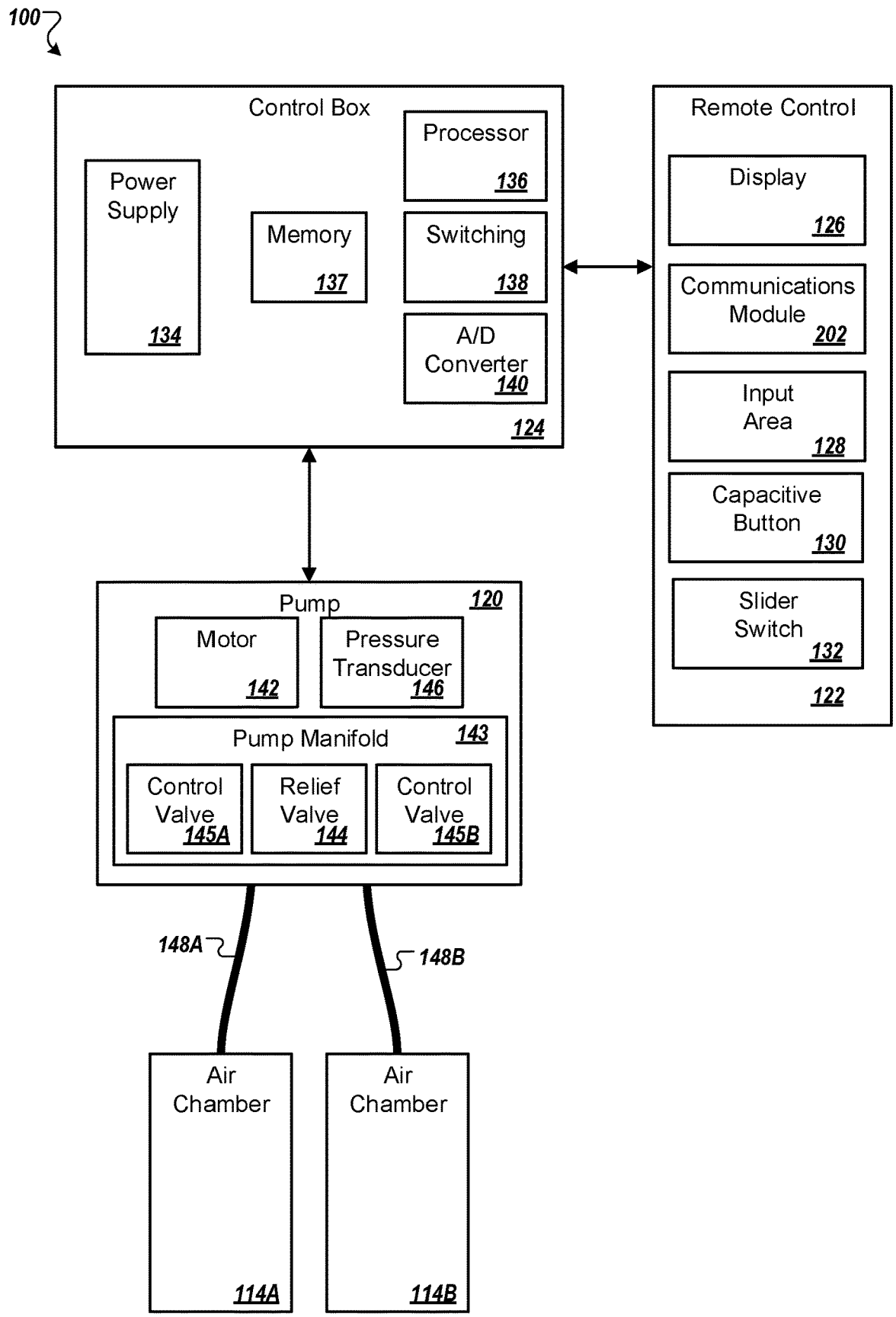
FIG. 2 is a block diagram of an example of various components of an air bed system.

FIG. 2 is a block diagram of an example of various components of an air bed system. For example, these components can be used in the example air bed system 100. As shown in FIG. 2, the control box 124 can include a power supply 134, a processor 136, a memory 137, a switching mechanism 138, and an analog to digital (A/D) converter 140. The switching mechanism 138 can be, for example, a relay or a solid state switch.

In some implementations, the switching mechanism 138 can be located in the pump 120 rather than the control box 124. The control box 124 receives signals from the remote control 122. The control box 124 transmits signals indicative of control states to the remote control 122.

The pump 120 and the remote control 122 are in two-way communication with the control box 124. The pump 120 includes a motor 142, a pump manifold 143, a relief valve 144, a first control valve 145A, a second control valve 145B, and a pressure transducer 146. The pump 120 is fluidly connected with the first air chamber 114A and the second air chamber 114B via a first tube 148A and a second tube 148B, respectively. The first and second control valves 145A and 145B can be controlled by switching mechanism 138, and are operable to regulate the flow of fluid between the pump 120 and first and second air chambers 114A and 114B, respectively.

The remote control 122 includes a communications module 202. The communications module allows communication between the remote control 122 and the control box 124. The communications module 202 transmits signals to the control box 124. For example, the communications module 202 can transmit a status signal or a command signal from the remote control 122 to the control box 124. For example, the status signal can be an electrical charge level (in other words a battery power percentage remaining), an error code representing an error condition of the remote 122, or a level of ambient light sensed by the remote control 122 (described later). The command signal can be a signal to change a condition of the bed 112. For example the condition of the bed can be a pressure, orientation, a temperature, a light level, a position of a portion of the bed 112, a configuration the portions of the bed 122 or the user name. The communications module 202 transmits the bed status and remote control 122 status to the display 126 for the user to see. The communications module 202 receives input (the command signal) from the user when the user operates the input area 128, the capacitive button 130, and/or the slider switch 132 to operate (to change the condition of) the bed 112. The communications module 202 communicates wirelessly with the control box 124. For example, the communications module 2020 can communicate via WiFi radio, Bluetooth Low Energy (BLE) radio, ZigBee radio, Bluetooth Classic, personal area network (i.e., Thread, 6LoWPan, BLE mesh, and Z-Wave), or a proprietary 2.4 Ghz or Sub-Ghz communication technology, described later in reference to FIG. 6.

In some implementations, the pump 120 and the control box 124 can be provided and packaged as a single unit. In some alternative implementations, the pump 120 and the control box 124 can be provided as physically separate units. In some implementations, the control box 124, the pump 120, or both are integrated within or otherwise contained within a bed frame or bed support structure that supports the bed 112. In some implementations, the control box 124, the pump 120, or both are located outside of a bed frame or bed support structure (as shown in the example in FIG. 1).

The example air bed system 100 depicted in FIG. 2 includes the two air chambers 114A and 114B and the single pump 120. However, other implementations can include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps can allow each air chamber to be inflated or deflated independently and simultaneously. Furthermore, additional pressure transducers can also be incorporated into the air bed system such that, for example, a separate pressure transducer can be associated with each air chamber.

In use, the user operates the input area 128, the capacitive button 130, and/or the slider switch 132 to generate the command signal to decrease pressure in one of the air chambers 114A or 114B. The communications module 202 receives the command signal to decrease pressure in one of the air chambers 114A or 114B and retransmits the command signal to decrease pressure in one of the air chambers 114A or 114B to the processor 136. The processor 138 controls the switching mechanism 138 to convert the low voltage command signals sent by the processor 136 to higher operating voltages sufficient to operate the relief valve 144 of the pump 120 and open the control valve 145A or 145B. Opening the relief valve 144 can allow air to escape from the air chamber 114A or 114B through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information usable by the processor 136. The processor 136 can send the digital signal to the remote control 122 to update the display 126 in order to convey the pressure information to the user.

As another example, the user operates either the input area 128 and/or the slider switch 132 to generate the command signal to increase pressure in one of the air chambers 114A or 114B. The communications module 202 receives the command signal to increase pressure in one of the air chambers 114A or 114B, then processes and retransmits command signal to increase pressure in one of the air chambers 114A or 114B to the processor 136. The processor 136 sends an increase pressure command to the pump motor 142. The pump motor 142 can be energized in response to the increase pressure command and send air to the designated one of the air chambers 114A or 114B through the air tube 148A or 148B via electronically operating the corresponding valve 145A or 145B. While air is being delivered to the designated air chamber 114A or 114B in order to increase the firmness of the chamber, the pressure transducer 146 can sense pressure within the pump manifold 143. Again, the pressure transducer 146 can send pressure readings to the processor 136 via the A/D converter 140. The processor 136 can use the information received from the A/D converter 140 to determine the difference between the actual pressure in air chamber 114A or 114B and the desired pressure. The processor 136 can send the digital signal to the remote control 122 to update display 126 in order to convey the pressure information to the user.

In another example, the remote control 122 wakes up in response to an action of the user, for instance, the user touching the remote control 122. Upon waking up, the remote control 122 transmits the status (a state of the user or the remote) signal, also called a ping, to the processor 136 in the control box 124. In response to receiving the status signal, the processor 126 transmits another status (for example, a state or condition of the bed) signal to the remote control 122. The remote control 122 receives the status signal from the processor 126. The remote control 122 then displays an interface on the display 126 for the user to interpret (see).

Generally speaking, during an inflation or deflation process, the pressure sensed within the pump manifold 143 can provide an approximation of the pressure within the respective air chamber that is in fluid communication with the pump manifold 143. An example method of obtaining a pump manifold pressure reading that is substantially equivalent to the actual pressure within an air chamber includes turning off pump 120, allowing the pressure within the air chamber 114A or 114B and the pump manifold 143 to equalize, and then sensing the pressure within the pump manifold 143 with the pressure transducer 146. Thus, providing a sufficient amount of time to allow the pressures within the pump manifold 143 and chamber 114A or 114B to equalize can result in pressure readings that are accurate approximations of the actual pressure within air chamber 114A or 114B. In some implementations, the pressure of the air chambers 114A and/or 114B can be continuously monitored using multiple pressure sensors (not shown).

In some implementations, information collected by the pressure transducer 146 can be analyzed to determine various states of a person lying on the bed 112. For example, the processor 136 can use information collected by the pressure transducer 146 to determine a heart rate or a respiration rate for a person lying in the bed 112. For example, a user can be lying on a side of the bed 112 that includes the chamber 114A. The pressure transducer 146 can monitor fluctuations in pressure of the chamber 114A and this information can be used to determine the user's heart rate and/or respiration rate. As another example, additional processing can be performed using the collected data to determine a sleep state of the person (e.g., awake, light sleep, deep sleep). For example, the processor 136 can determine when a person falls asleep and, while asleep, the various sleep states of the person.

Additional information associated with a user of the air bed system 100 that can be determined using information collected by the pressure transducer 146 includes motion of the user, presence of the user on a surface of the bed 112, weight of the user, heart arrhythmia of the user, and apnea. Taking user presence detection for example, the pressure transducer 146 can be used to detect the user's presence on the bed 112, e.g., via a gross pressure change determination and/or via one or more of a respiration rate signal, heart rate signal, and/or other biometric signals. For example, a simple pressure detection process can identify an increase in pressure as an indication that the user is present on the bed 112. As another example, the processor 136 can determine that the user is present on the bed 112 if the detected pressure increases above a specified threshold (so as to indicate that a person or other object above a certain weight is positioned on the bed 112). As yet another example, the processor 136 can identify an increase in pressure in combination with detected slight, rhythmic fluctuations in pressure as corresponding to the user being present on the bed 112. The presence of rhythmic fluctuations can be identified as being caused by respiration or heart rhythm (or both) of the user. The detection of respiration or a heartbeat can distinguish between the user being present on the bed and another object (e.g., a suit case) being placed upon the bed.

In some implementations, fluctuations in pressure can be measured at the pump 120. For example, one or more pressure sensors can be located within one or more internal cavities of the pump 120 to detect fluctuations in pressure within the pump 120. The fluctuations in pressure detected at the pump 120 can indicate fluctuations in pressure in one or both of the chambers 114A and 114B. One or more sensors located at the pump 120 can be in fluid communication with the one or both of the chambers 114A and 114B, and the sensors can be operative to determine pressure within the chambers 114A and 114B. The control box 124 can be configured to determine at least one vital sign (e.g., heart rate, respiratory rate) based on the pressure within the chamber 114A or the chamber 114B.

In some implementations, the control box 124 can analyze a pressure signal detected by one or more pressure sensors to determine a heart rate, respiration rate, and/or other vital signs of a user lying or sitting on the chamber 114A or the chamber 114B. More specifically, when a user lies on the bed 112 positioned over the chamber 114A, each of the user's heart beats, breaths, and other movements can create a force on the bed 112 that is transmitted to the chamber 114A. As a result of the force input to the chamber 114A from the user's movement, a wave can propagate through the chamber 114A and into the pump 120. A pressure sensor located at the pump 120 can detect the wave, and thus the pressure signal output by the sensor can indicate a heart rate, respiratory rate, or other information regarding the user.

With regard to sleep state, air bed system 100 can determine a user's sleep state by using various biometric signals such as heart rate, respiration, and/or movement of the user. While the user is sleeping, the processor 136 can receive one or more of the user's biometric signals (e.g., heart rate, respiration, and motion) and determine the user's present sleep state based on the received biometric signals. In some implementations, signals indicating fluctuations in pressure in one or both of the chambers 114A and 114B can be amplified and/or filtered to allow for more precise detection of heart rate and respiratory rate.

The control box 124 can perform a pattern recognition algorithm or other calculation based on the amplified and filtered pressure signal to determine the user's heart rate and respiratory rate. For example, the algorithm or calculation can be based on assumptions that a heart rate portion of the signal has a frequency in the range of 0.5-4.0 Hz and that a respiration rate portion of the signal a has a frequency in the range of less than 1 Hz. The control box 124 can also be configured to determine other characteristics of a user based on the received pressure signal, such as blood pressure, tossing and turning movements, rolling movements, limb movements, weight, the presence or lack of presence of a user, and/or the identity of the user. Techniques for monitoring a user's sleep using heart rate information, respiration rate information, and other user information are disclosed in U.S. Patent Application Publication No. 20100170043 to Steven J. Young et al., titled "APPARATUS FOR MONITORING VITAL SIGNS," the entire contents of which is incorporated herein by reference.

For example, the pressure transducer 146 can be used to monitor the air pressure in the chambers 114A and 114B of the bed 112. If the user on the bed 112 is not moving, the air pressure changes in the air chamber 114A or 114B can be relatively minimal, and can be attributable to respiration and/or heartbeat. When the user on the bed 112 is moving, however, the air pressure in the mattress can fluctuate by a much larger amount. Thus, the pressure signals generated by the pressure transducer 146 and received by the processor 136 can be filtered and indicated as corresponding to motion, heartbeat, or respiration.

In some implementations, rather than performing the data analysis in the control box 124 with the processor 136, a digital signal processor (DSP) can be provided to analyze the data collected by the pressure transducer 146. Alternatively, the data collected by the pressure transducer 146 could be sent to a cloud-based computing system for remote analysis.

In some implementations, the example air bed system 100 further includes a temperature controller configured to increase, decrease, or maintain the temperature of a bed, for example for the comfort of the user. For example, a pad can be placed on top of or be part of the bed 112, or can be placed on top of or be part of one or both of the chambers 114A and 114B. Air can be pushed through the pad and vented to cool off a user of the bed. Conversely, the pad can include a heating element that can be used to keep the user warm. In some implementations, the temperature controller can receive temperature readings from the pad. In some implementations, separate pads are used for the different sides of the bed 112 (e.g., corresponding to the locations of the chambers 114A and 114B) to provide for differing temperature control for the different sides of the bed.

In some implementations, the user of the air bed system 100 can use an input device, such as the remote control 122, to input a desired temperature for the surface of the bed 112 (or for a portion of the surface of the bed 112). The desired temperature can be encapsulated in a command data structure that includes the desired temperature as well as identifies the temperature controller as the desired component to be controlled. The command data structure can then be transmitted via Bluetooth or another suitable communication protocol to the processor 136. In various examples, the command data structure is encrypted before being transmitted. The temperature controller can then configure its elements to increase or decrease the temperature of the pad depending on the temperature input into remote control 122 by the user.

In some implementations, data can be transmitted from a component back to the processor 136 or to one or more display devices, such as the display 126. For example, the current temperature as determined by a sensor element of temperature controller, the pressure of the bed, the current position of the foundation or other information can be transmitted to control box 124. The control box 124 can then transmit the received information to remote control 122 where it can be displayed to the user (e.g., on the display 126).

In some implementations, the example air bed system 100 further includes an adjustable foundation and an articulation controller configured to adjust the position of a bed (e.g., the bed 112) by adjusting the adjustable foundation that supports the bed. For example, the articulation controller can adjust the bed 112 from a flat position to a position in which a head portion of a mattress of the bed is inclined upward (e.g., to facilitate a user sitting up in bed and/or watching television). In some implementations, the bed 112 includes multiple separately articulable sections. For example, portions of the bed corresponding to the locations of the chambers 114A and 114B can be articulated independently from each other, to allow one person positioned on the bed 112 surface to rest in a first position (e.g., a flat position) while a second person rests in a second position (e.g., an reclining position with the head raised at an angle from the waist). In some implementations, separate positions can be set for two different beds (e.g., two twin beds placed next to each other). The foundation of the bed 112 can include more than one zone that can be independently adjusted. The articulation controller can also be configured to provide different levels of massage to one or more users on the bed 112.

Example of a Bed in a Bedroom Environment

Figure 3:
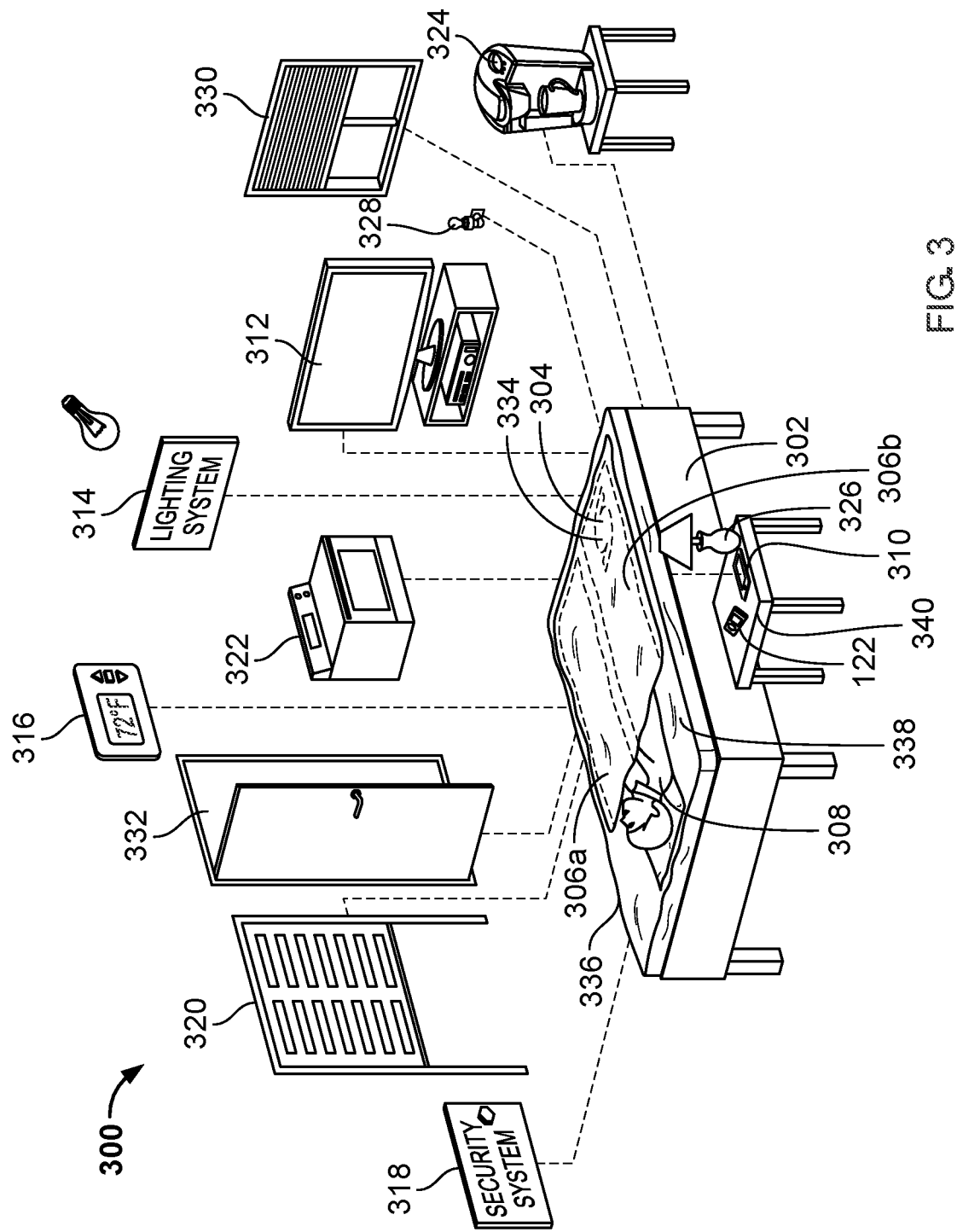
FIG. 3 shows an example environment including a bed in communication with devices located in and around a home.

FIG. 3 shows an example environment 300 including a bed 302 in communication with devices located in and around a home. In the example shown, the bed 302 includes pump 304 for controlling air pressure within two air chambers 306a and 306b (as described above with respect to the air chambers 114A-114B). The pump 304 additionally includes circuitry for controlling inflation and deflation functionality performed by the pump 304. The circuitry is further programmed to detect fluctuations in air pressure of the air chambers 306a-b and used the detected fluctuations in air pressure to identify bed presence of a user 308, sleep state of the user 308, movement of the user 308, and biometric signals of the user 308 such as heart rate and respiration rate. In the example shown, the pump 304 is located within a support structure of the bed 302 and the control circuitry 334 for controlling the pump 304 is integrated with the pump 304. In some implementations, the control circuitry 334 is physically separate from the pump 304 and is in wireless or wired communication with the pump 304. In some implementations, the pump 304 and/or control circuitry 334 are located outside of the bed 302. In some implementations, various control functions can be performed by systems located in different physical locations. For example, circuitry for controlling actions of the pump 304 can be located within a pump casing of the pump 304 while control circuitry 334 for performing other functions associated with the bed 302 can be located in another portion of the bed 302, or external to the bed 302. As another example, control circuitry 334 located within the pump 304 can communicate with control circuitry 334 at a remote location through a LAN or WAN (e.g., the internet), either wireless or wired communications. As yet another example, the control circuitry 334 can be included in the control box 124 of FIGS. 1 and 2.

The bed 300 includes the remote control 122. The remote control 122 transmits command signals and status signals to the bed 300 as previously described in reference to FIGS. 1 and 2.

In some implementations, one or more devices other than, or in addition to, the pump 304 and control circuitry 334 can be utilized to identify user bed presence, sleep state, movement, and biometric signals. For example, the bed 302 can include a second pump in addition to the pump 304, with each of the two pumps connected to a respective one of the air chambers 306a-b. For example, the pump 304 can be in fluid communication with the air chamber 306b to control inflation and deflation of the air chamber 306b as well as detect user signals for a user located over the air chamber 306b such as bed presence, sleep state, movement, and biometric signals while the second pump is in fluid communication with the air chamber 306a to control inflation and deflation of the air chamber 306a as well as detect user signals for a user located over the air chamber 306a.

As another example, the bed 302 can include one or more pressure sensitive pads or surface portions that are operable to detect movement, including user presence, user motion, respiration, and heart rate. For example, a first pressure sensitive pad can be incorporated into a surface of the bed 302 over a left portion of the bed 302, where a first user would normally be located during sleep, and a second pressure sensitive pad can be incorporated into the surface of the bed 302 over a right portion of the bed 302, where a second user would normally be located during sleep. The movement detected by the one or more pressure sensitive pads or surface portions can be used by control circuitry 334 to identify user sleep state, bed presence, or biometric signals.

In some implementations, information detected by the bed (e.g., motion information) is processed by control circuitry 334 (e.g., control circuitry 334 integrated with the pump 304) and provided to one or more user devices such as a user device 310 for presentation to the user 308 or to other users. In the example depicted in FIG. 3, the user device 310 is a tablet device; however, in some implementations, the user device 310 can be a personal computer, a smart phone, a smart television (e.g., a television 312), or other user device capable of wired or wireless communication with the control circuitry 334. The user device 310 can be in communication with control circuitry 334 of the bed 302 through a network or through direct point-to-point communication. For example, the control circuitry 334 can be connected to a LAN (e.g., through a Wi-Fi router) and communicate with the user device 310 through the LAN (either wired or wireless communications). As another example, the control circuitry 334 and the user device 310 can both connect to the Internet and communicate through the Internet. For example, the control circuitry 334 can connect to the Internet through a WiFi router and the user device 310 can connect to the Internet through communication with a cellular communication system. As another example, the control circuitry 334 can communicate directly with the user device 310 through a wireless communication protocol such as Bluetooth. As yet another example, the control circuitry 334 can communicate with the user device 310 through a wireless communication protocol such as ZigBee, Z-Wave, infrared, Thread, 6LoPan, BLE, Bluetooth, or another wireless communication protocol suitable for the application. As another example, the control circuitry 334 can communicate with the user device 310 through a wired connection such as, for example, a USB connector, serial/RS232, or another wired connection suitable for the application.

The user device 310 can display a variety of information and statistics related to sleep, or user 308's interaction with the bed 302. For example, a user interface displayed by the user device 310 can present information including amount of sleep for the user 308 over a period of time (e.g., a single evening, a week, a month, etc.) amount of deep sleep, ratio of deep sleep to restless sleep, time lapse between the user 308 getting into bed and the user 308 falling asleep, total amount of time spent in the bed 302 for a given period of time, heart rate for the user 308 over a period of time, respiration rate for the user 308 over a period of time, or other information related to user interaction with the bed 302 by the user 308 or one or more other users of the bed 302. In some implementations, information for multiple users can be presented on the user device 310, for example information for a first user positioned over the air chamber 306a can be presented along with information for a second user positioned over the air chamber 306b. In some implementations, the information presented on the user device 310 can vary according to the age of the user 308. For example, the information presented on the user device 310 can evolve with the age of the user 308 such that different information is presented on the user device 310 as the user 308 ages as a child or an adult.

The user device 310 can also be used as an interface for the control circuitry 334 of the bed 302 to allow the user 308 to enter information. The information entered by the user 308 can be used by the control circuitry 334 to provide better information to the user or to various control signals for controlling functions of the bed 302 or other devices. For example, the user can enter information such as weight, height, and age and the control circuitry 334 can use this information to provide the user 308 with a comparison of the user's tracked sleep information to sleep information of other people having similar weights, heights, and/or ages as the user 308. As another example, the user 308 can use the user device 310 as an interface for controlling air pressure of the air chambers 306a and 306b, for controlling various recline or incline positions of the bed 302, for controlling temperature of one or more surface temperature control devices of the bed 302, or for allowing the control circuitry 334 to generate control signals for other devices (as described in greater detail below).

In some implementations, control circuitry 334 of the bed 302 (e.g., control circuitry 334 integrated into the pump 304) can communicate with other first, second, or third party devices or systems in addition to or instead of the user device 310. For example, the control circuitry 334 can communicate with the television 312, a lighting system 314, a thermostat 316, a security system 318, or other household devices such as an oven 322, a coffee maker 324, a lamp 326 on a bedside table 340, and a nightlight 328. Other examples of devices and/or systems that the control circuitry 334 can communicate with include a system for controlling window blinds 330, one or more devices for detecting or controlling the states of one or more doors 332 (such as detecting if a door is open, detecting if a door is locked, or automatically locking a door), and a system for controlling a garage door 320 (e.g., control circuitry 334 integrated with a garage door opener for identifying an open or closed state of the garage door 320 and for causing the garage door opener to open or close the garage door 320). Communications between the control circuitry 334 of the bed 302 and other devices can occur through a network (e.g., a LAN or the Internet) or as point-to-point communication (e.g., using Bluetooth, radio communication, or a wired connection). In some implementations, control circuitry 334 of different beds 302 can communicate with different sets of devices. For example, a kid bed may not communicate with and/or control the same devices as an adult bed. In some embodiments, the bed 302 can evolve with the age of the user such that the control circuitry 334 of the bed 302 communicates with different devices as a function of age of the user.

The control circuitry 334 can receive information and inputs from other devices/systems and use the received information and inputs to control actions of the bed 302 or other devices. For example, the control circuitry 334 can receive information from the thermostat 316 indicating a current environmental temperature for a house or room in which the bed 302 is located. The control circuitry 334 can use the received information (along with other information) to determine if a temperature of all or a portion of the surface of the bed 302 should be raised or lowered. The control circuitry 334 can then cause a heating or cooling mechanism of the bed 302 to raise or lower the temperature of the surface of the bed 302. For example, the user 308 can indicate a desired sleeping temperature of 74 degrees while a second user of the bed 302 indicates a desired sleeping temperature of 72 degrees. The thermostat 316 can indicate to the control circuitry 334 that the current temperature of the bedroom is 72 degrees. The control circuitry 334 can identify that the user 308 has indicated a desired sleeping temperature of 74 degrees, and send control signals to a heating pad located on the user 308's side of the bed to raise the temperature of the portion of the surface of the bed 302 where the user 308 is located to raise the temperature of the user 308's sleeping surface to the desired temperature.

The control circuitry 334 can also generate control signals controlling other devices and propagate the control signals to the other devices. In some implementations, the control signals are generated based on information collected by the control circuitry 334, including information related to user interaction with the bed 302 by the user 308 and/or one or more other users. In some implementations, information collected from one or more other devices other than the bed 302 are used when generating the control signals. For example, information relating to environmental occurrences (e.g., environmental temperature, environmental noise level, and environmental light level), time of day, time of year, day of the week, or other information can be used when generating control signals for various devices in communication with the control circuitry 334 of the bed 302. For example, information on the time of day can be combined with information relating to movement and bed presence of the user 308 to generate control signals for the lighting system 314. In some implementations, rather than or in addition to providing control signals for one or more other devices, the control circuitry 334 can provide collected information (e.g., information related to user movement, bed presence, sleep state, or biometric signals for the user 308) to one or more other devices to allow the one or more other devices to utilize the collected information when generating control signals. For example, control circuitry 334 of the bed 302 can provide information relating to user interactions with the bed 302 by the user 308 to a central controller (not shown) that can use the provided information to generate control signals for various devices, including the bed 302.

Still referring to FIG. 3, the control circuitry 334 of the bed 302 can generate control signals for controlling actions of other devices, and transmit the control signals to the other devices in response to information collected by the control circuitry 334, including bed presence of the user 308, sleep state of the user 308, and other factors. For example, control circuitry 334 integrated with the pump 304 can detect a feature of a mattress of the bed 302, such as an increase in pressure in the air chamber 306*b*, and use this detected increase in air pressure to determine that the user 308 is present on the bed 302. In some implementations, the control circuitry 334 can identify a heart rate or respiratory rate for the user 308 to identify that the increase in pressure is due to a person sitting, laying, or otherwise resting on the bed 302 rather than an inanimate object (such as a suitcase) having been placed on the bed 302. In some implementations, the information indicating user bed presence is combined with other information to identify a current or future likely state for the user 308. For example, a detected user bed presence at 11:00 am can indicate that the user is sitting on the bed (e.g., to tie her shoes, or to read a book) and does not intend to go to sleep, while a detected user bed presence at 10:00 pm can indicate that the user 308 is in bed for the evening and is intending to fall asleep soon. As another example, if the control circuitry 334 detects that the user 308 has left the bed 302 at 6:30 am (e.g., indicating that the user 308 has woken up for the day), and then later detects user bed presence of the user 308 at 7:30 am, the control circuitry 334 can use this information that the newly detected user bed presence is likely temporary (e.g., while the user 308 ties her shoes before heading to work) rather than an indication that the user 308 is intending to stay on the bed 302 for an extended period.

In some implementations, the control circuitry 334 is able to use collected information (including information related to user interaction with the bed 302 by the user 308, as well as environmental information, time information, and input received from the user) to identify use patterns for the user 308. For example, the control circuitry 334 can use information indicating bed presence and sleep states for the user 308 collected over a period of time to identify a sleep pattern for the user. For example, the control circuitry 334 can identify that the user 308 generally goes to bed between 9:30 pm and 10:00 pm, generally falls asleep between 10:00 pm and 11:00 pm, and generally wakes up between 6:30 am and 6:45 am based on information indicating user presence and biometrics for the user 308 collected over a week. The control circuitry 334 can use identified patterns for a user to better process and identify user interactions with the bed 302 by the user 308. If the user does stay in bed, then a new sleep pattern can be started.

For example, given the above example user bed presence, sleep, and wake patterns for the user 308, if the user 308 is detected as being on the bed at 3:00 pm, the control circuitry 334 can determine that the user's presence on the bed is only temporary, and use this determination to generate different control signals than would be generated if the control circuitry 334 determined that the user 308 was in bed for the evening. As another example, if the control circuitry 334 detects that the user 308 has gotten out of bed at 3:00 am, the control circuitry 334 can use identified patterns for the user 308 to determine that the user has only gotten up temporarily (for example, to use the rest room, or get a glass of water) and is not up for the day. By contrast, if the control circuitry 334 identifies that the user 308 has gotten out of the bed 302 at 6:40 am, the control circuitry 334 can determine that the user is up for the day and generate a different set of control signals than those that would be generated if it were determined that the user 308 were only getting out of bed temporarily (as would be the case when the user 308 gets out of the bed 302 at 3:00 am). For other users 308, getting out of the bed 302 at 3:00 am can be the normal wake-up time, which the control circuitry 334 can learn and respond to accordingly.

As described above, the control circuitry 334 for the bed 302 can generate control signals for control functions of various other devices. The control signals can be generated, at least in part, based on detected interactions by the user 308 with the bed 302, as well as other information including time, date, temperature, etc. For example, the control circuitry 334 can communicate with the television 312, receive information from the television 312, and generate control signals for controlling functions of the television 312. For example, the control circuitry 334 can receive an indication from the television 312 that the television 312 is currently on. If the television 312 is located in a different room from the bed 302, the control circuitry 334 can generate a control signal to turn the television 312 off upon making a determination that the user 308 has gone to bed for the evening. For example, if bed presence of the user 308 on the bed 302 is detected during a particular time range (e.g., between 8:00 pm and 7:00 am) and persists for longer than a threshold period of time (e.g., 10 minutes) the control circuitry 334 can use this information to determine that the user 308 is in bed for the evening. If the television 312 is on (as indicated by communications received by the control circuitry 334 of the bed 302 from the television 312) the control circuitry 334 can generate a control signal to turn the television 312 off. The control signals can then be transmitted to the television (e.g., through a directed communication link between the television 312 and the control circuitry 334 or through a network). As another example, rather than turning off the television 312 in response to detection of user bed presence, the control circuitry 334 can generate a control signal that causes the volume of the television 312 to be lowered by a pre-specified amount.

As another example, upon detecting that the user 308 has left the bed 302 during a specified time range (e.g., between 6:00 am and 8:00 am) the control circuitry 334 can generate control signals to cause the television 312 to turn on and tune to a pre-specified channel (e.g., the user 308 has indicated a preference for watching the morning news upon getting out of bed in the morning). The control circuitry 334 can generate the control signal and transmit the signal to the television 312 to cause the television 312 to turn on and tune to the desired station (which could be stored at the control circuitry 334, the television 312, or another location). As another example, upon detecting that the user 308 has gotten up for the day, the control circuitry 334 can generate and transmit control signals to cause the television 312 to turn on and begin playing a previously recorded program from a digital video recorder (DVR) in communication with the television 312.

As another example, if the television 312 is in the same room as the bed 302, the control circuitry 334 does not cause the television 312 to turn off in response to detection of user bed presence. Rather, the control circuitry 334 can generate and transmit control signals to cause the television 312 to turn off in response to determining that the user 308 is asleep. For example, the control circuitry 334 can monitor biometric signals of the user 308 (e.g., motion, heart rate, respiration rate) to determine that the user 308 has fallen asleep. Upon detecting that the user 308 is sleeping, the control circuitry 334 generates and transmits a control signal to turn the television 312 off. As another example, the control circuitry 334 can generate the control signal to turn off the television 312 after a threshold period of time after the user 308 has fallen asleep (e.g., 10 minutes after the user has fallen asleep). As another example, the control circuitry 334 generates control signals to lower the volume of the television 312 after determining that the user 308 is asleep. As yet another example, the control circuitry 334 generates and transmits a control signal to cause the television to gradually lower in volume over a period of time and then turn off in response to determining that the user 308 is asleep.

In some implementations, the control circuitry 334 can similarly interact with other media devices, such as computers, tablets, smart phones, stereo systems, etc. For example, upon detecting that the user 308 is asleep, the control circuitry 334 can generate and transmit a control signal to the user device 310 to cause the user device 310 to turn off, or turn down the volume on a video or audio file being played by the user device 310.

The control circuitry 334 can additionally communicate with the lighting system 314, receive information from the lighting system 314, and generate control signals for controlling functions of the lighting system 314. For example, upon detecting user bed presence on the bed 302 during a certain time frame (e.g., between 8:00 pm and 7:00 am) that lasts for longer than a threshold period of time (e.g., 10 minutes) the control circuitry 334 of the bed 302 can determine that the user 308 is in bed for the evening. In response to this determination, the control circuitry 334 can generate control signals to cause lights in one or more rooms other than the room in which the bed 302 is located to switch off. The control signals can then be transmitted to the lighting system 314 and executed by the lighting system 314 to cause the lights in the indicated rooms to shut off. For example, the control circuitry 334 can generate and transmit control signals to turn off lights in all common rooms, but not in other bedrooms. As another example, the control signals generated by the control circuitry 334 can indicate that lights in all rooms other than the room in which the bed 302 is located are to be turned off, while one or more lights located outside of the house containing the bed 302 are to be turned on, in response to determining that the user 308 is in bed for the evening. Additionally, the control circuitry 334 can generate and transmit control signals to cause the nightlight 328 to turn on in response to determining user 308 bed presence or whether the user 308 is asleep. As another example, the control circuitry 334 can generate first control signals for turning off a first set of lights (e.g., lights in common rooms) in response to detecting user bed presence, and second control signals for turning off a second set of lights (e.g., lights in the room in which the bed 302 is located) in response to detecting that the user 308 is asleep.

In some implementations, in response to determining that the user 308 is in bed for the evening, the control circuitry 334 of the bed 302 can generate control signals to cause the lighting system 314 to implement a sunset lighting scheme in the room in which the bed 302 is located. A sunset lighting scheme can include, for example, dimming the lights (either gradually over time, or all at once) in combination with changing the color of the light in the bedroom environment, such as adding an amber hue to the lighting in the bedroom. The sunset lighting scheme can help to put the user 308 to sleep when the control circuitry 334 has determined that the user 308 is in bed for the evening.

The control circuitry 334 can also be configured to implement a sunrise lighting scheme when the user 308 wakes up in the morning. The control circuitry 334 can determine that the user 308 is awake for the day, for example, by detecting that the user 308 has gotten off of the bed 302 (i.e., is no longer present on the bed 302) during a specified time frame (e.g., between 6:00 am and 8:00 am). As another example, the control circuitry 334 can monitor movement, heart rate, respiratory rate, or other biometric signals of the user 308 to determine that the user 308 is awake even though the user 308 has not gotten out of bed. If the control circuitry 334 detects that the user is awake during a specified time frame, the control circuitry 334 can determine that the user 308 is awake for the day. The specified time frame can be, for example, based on previously recorded user bed presence information collected over a period of time (e.g., two weeks) that indicates that the user 308 usually wakes up for the day between 6:30 am and 7:30 am. In response to the control circuitry 334 determining that the user 308 is awake, the control circuitry 334 can generate control signals to cause the lighting system 314 to implement the sunrise lighting scheme in the bedroom in which the bed 302 is located. The sunrise lighting scheme can include, for example, turning on lights (e.g., the lamp 326, or other lights in the bedroom). The sunrise lighting scheme can further include gradually increasing the level of light in the room where the bed 302 is located (or in one or more other rooms). The sunrise lighting scheme can also include only turning on lights of specified colors. For example, the sunrise lighting scheme can include lighting the bedroom with blue light to gently assist the user 308 in waking up and becoming active.

In some implementations, the control circuitry 334 can generate different control signals for controlling actions of one or more components, such as the lighting system 314, depending on a time of day that user interactions with the bed 302 are detected. For example, the control circuitry 334 can use historical user interaction information for interactions between the user 308 and the bed 302 to determine that the user 308 usually falls asleep between 10:00 pm and 11:00 pm and usually wakes up between 6:30 am and 7:30 am on weekdays. The control circuitry 334 can use this information to generate a first set of control signals for controlling the lighting system 314 if the user 308 is detected as getting out of bed at 3:00 am and to generate a second set of control signals for controlling the lighting system 314 if the user 308 is detected as getting out of bed after 6:30 am. For example, if the user 308 gets out of bed prior to 6:30 am, the control circuitry 334 can turn on lights that guide the user 308's route to a restroom. As another example, if the user 308 gets out of bed prior to 6:30 am, the control circuitry 334 can turn on lights that guide the user 308's route to the kitchen (which can include, for example, turning on the nightlight 328, turning on under bed lighting, or turning on the lamp 326).

As another example, if the user 308 gets out of bed after 6:30 am, the control circuitry 334 can generate control signals to cause the lighting system 314 to initiate a sunrise lighting scheme, or to turn on one or more lights in the bedroom and/or other rooms. In some implementations, if the user 308 is detected as getting out of bed prior to a specified morning rise time for the user 308, the control circuitry 334 causes the lighting system 314 to turn on lights that are dimmer than lights that are turned on by the lighting system 314 if the user 308 is detected as getting out of bed after the specified morning rise time. Causing the lighting system 314 to only turn on dim lights when the user 308 gets out of bed during the night (i.e., prior to normal rise time for the user 308) can prevent other occupants of the house from being woken by the lights while still allowing the user 308 to see in order to reach the restroom, kitchen, or another destination within the house.

The historical user interaction information for interactions between the user 308 and the bed 302 can be used to identify user sleep and awake time frames. For example, user bed presence times and sleep times can be determined for a set period of time (e.g., two weeks, a month, etc.). The control circuitry 334 can then identify a typical time range or time frame in which the user 308 goes to bed, a typical time frame for when the user 308 falls asleep, and a typical time frame for when the user 308 wakes up (and in some cases, different time frames for when the user 308 wakes up and when the user 308 actually gets out of bed). In some implementations, buffer time can be added to these time frames. For example, if the user is identified as typically going to bed between 10:00 pm and 10:30 pm, a buffer of a half hour in each direction can be added to the time frame such that any detection of the user getting onto the bed between 9:30 pm and 11:00 pm is interpreted as the user 308 going to bed for the evening. As another example, detection of bed presence of the user 308 starting from a half hour before the earliest typical time that the user 308 goes to bed extending until the typical wake up time (e.g., 6:30 am) for the user can be interpreted as the user going to bed for the evening. For example, if the user typically goes to bed between 10:00 pm and 10:30 pm, if the user's bed presence is sensed at 12:30 am one night, that can be interpreted as the user getting into bed for the evening even though this is outside of the user's typical time frame for going to bed because it has occurred prior to the user's normal wake up time. In some implementations, different time frames are identified for different times of the year (e.g., earlier bed time during winter vs. summer) or at different times of the week (e.g., user wakes up earlier on weekdays than on weekends).

The control circuitry 334 can distinguish between the user 308 going to bed for an extended period (such as for the night) as opposed to being present on the bed 302 for a shorter period (such as for a nap) by sensing duration of presence of the user 308. In some examples, the control circuitry 334 can distinguish between the user 308 going to bed for an extended period (such as for the night) as opposed to going to bed for a shorter period (such as for a nap) by sensing duration of sleep of the user 308. For example, the control circuitry 334 can set a time threshold whereby if the user 308 is sensed on the bed 302 for longer than the threshold, the user 308 is considered to have gone to bed for the night. In some examples, the threshold can be about 2 hours, whereby if the user 308 is sensed on the bed 302 for greater than 2 hours, the control circuitry 334 registers that as an extended sleep event. In other examples, the threshold can be greater than or less than two hours.

The control circuitry 334 can detect repeated extended sleep events to determine a typical bed time range of the user 308 automatically, without requiring the user 308 to enter a bed time range. This can allow the control circuitry 334 to accurately estimate when the user 308 is likely to go to bed for an extended sleep event, regardless of whether the user 308 typically goes to bed using a traditional sleep schedule or a non-traditional sleep schedule. The control circuitry 334 can then use knowledge of the bed time range of the user 308 to control one or more components (including components of the bed 302 and/or non-bed peripherals) differently based on sensing bed presence during the bed time range or outside of the bed time range.

In some examples, the control circuitry 334 can automatically determine the bed time range of the user 308 without requiring user inputs. In some examples, the control circuitry 334 can determine the bed time range of the user 308 automatically and in combination with user inputs. In some examples, the control circuitry 334 can set the bed time range directly according to user inputs. In some examples, the control circuity 334 can associate different bed times with different days of the week. In each of these examples, the control circuitry 334 can control one or more components (such as the lighting system 314, the thermostat 316, the security system 318, the oven 322, the coffee maker 324, the lamp 326, and the nightlight 328), as a function of sensed bed presence and the bed time range.

The control circuitry 334 can additionally communicate with the thermostat 316, receive information from the thermostat 316, and generate control signals for controlling functions of the thermostat 316. For example, the user 308 can indicate user preferences for different temperatures at different times, depending on the sleep state or bed presence of the user 308. For example, the user 308 may prefer an environmental temperature of 72 degrees when out of bed, 70 degrees when in bed but awake, and 68 degrees when sleeping. The control circuitry 334 of the bed 302 can detect bed presence of the user 308 in the evening and determine that the user 308 is in bed for the night. In response to this determination, the control circuitry 334 can generate control signals to cause the thermostat to change the temperature to 70 degrees. The control circuitry 334 can then transmit the control signals to the thermostat 316. Upon detecting that the user 308 is in bed during the bed time range or asleep, the control circuitry 334 can generate and transmit control signals to cause the thermostat 316 to change the temperature to 68. The next morning, upon determining that the user is awake for the day (e.g., the user 308 gets out of bed after 6:30 am) the control circuitry 334 can generate and transmit control circuitry 334 to cause the thermostat to change the temperature to 72 degrees.

In some implementations, the control circuitry 334 can similarly generate control signals to cause one or more heating or cooling elements on the surface of the bed 302 to change temperature at various times, either in response to user interaction with the bed 302 or at various pre-programmed times. For example, the control circuitry 334 can activate a heating element to raise the temperature of one side of the surface of the bed 302 to 73 degrees when it is detected that the user 308 has fallen asleep. As another example, upon determining that the user 308 is up for the day, the control circuitry 334 can turn off a heating or cooling element. As yet another example, the user 308 can pre-program various times at which the temperature at the surface of the bed should be raised or lowered. For example, the user can program the bed 302 to raise the surface temperature to 76 degrees at 10:00 pm, and lower the surface temperature to 68 degrees at 11:30 pm.

In some implementations, in response to detecting user bed presence of the user 308 and/or that the user 308 is asleep, the control circuitry 334 can cause the thermostat 316 to change the temperature in different rooms to different values. For example, in response to determining that the user 308 is in bed for the evening, the control circuitry 334 can generate and transmit control signals to cause the thermostat 316 to set the temperature in one or more bedrooms of the house to 72 degrees and set the temperature in other rooms to 67 degrees.

The control circuitry 334 can also receive temperature information from the thermostat 316 and use this temperature information to control functions of the bed 302 or other devices. For example, as discussed above, the control circuitry 334 can adjust temperatures of heating elements included in the bed 302 in response to temperature information received from the thermostat 316.

In some implementations, the control circuitry 334 can generate and transmit control signals for controlling other temperature control systems. For example, in response to determining that the user 308 is awake for the day, the control circuitry 334 can generate and transmit control signals for causing floor heating elements to activate. For example, the control circuitry 334 can cause a floor heating system for a master bedroom to turn on in response to determining that the user 308 is awake for the day.

The control circuitry 334 can additionally communicate with the security system 318, receive information from the security system 318, and generate control signals for controlling functions of the security system 318. For example, in response to detecting that the user 308 in is bed for the evening, the control circuitry 334 can generate control signals to cause the security system to engage or disengage security functions. The control circuitry 334 can then transmit the control signals to the security system 318 to cause the security system 318 to engage. As another example, the control circuitry 334 can generate and transmit control signals to cause the security system 318 to disable in response to determining that the user 308 is awake for the day (e.g., user 308 is no longer present on the bed 302 after 6:00 am). In some implementations, the control circuitry 334 can generate and transmit a first set of control signals to cause the security system 318 to engage a first set of security features in response to detecting user bed presence of the user 308, and can generate and transmit a second set of control signals to cause the security system 318 to engage a second set of security features in response to detecting that the user 308 has fallen asleep.

In some implementations, the control circuitry 334 can receive alerts from the security system 318 (and/or a cloud service associated with the security system 318) and indicate the alert to the user 308. For example, the control circuitry 334 can detect that the user 308 is in bed for the evening and in response, generate and transmit control signals to cause the security system 318 to engage or disengage. The security system can then detect a security breach (e.g., someone has opened the door 332 without entering the security code, or someone has opened a window when the security system 318 is engaged). The security system 318 can communicate the security breach to the control circuitry 334 of the bed 302. In response to receiving the communication from the security system 318, the control circuitry 334 can generate control signals to alert the user 308 to the security breach. For example, the control circuitry 334 can cause the bed 302 to vibrate. As another example, the control circuitry 334 can cause portions of the bed 302 to articulate (e.g., cause the head section to raise or lower) in order to wake the user 308 and alert the user to the security breach. As another example, the control circuitry 334 can generate and transmit control signals to cause the lamp 326 to flash on and off at regular intervals to alert the user 308 to the security breach. As another example, the control circuitry 334 can alert the user 308 of one bed 302 regarding a security breach in a bedroom of another bed, such as an open window in a kid's bedroom. As another example, the control circuitry 334 can send an alert to a garage door controller (e.g., to close and lock the door). As another example, the control circuitry 334 can send an alert for the security to be disengaged.

The control circuitry 334 can additionally generate and transmit control signals for controlling the garage door 320 and receive information indicating a state of the garage door 320 (i.e., open or closed). For example, in response to determining that the user 308 is in bed for the evening, the control circuitry 334 can generate and transmit a request to a garage door opener or another device capable of sensing if the garage door 320 is open. The control circuitry 334 can request information on the current state of the garage door 320. If the control circuitry 334 receives a response (e.g., from the garage door opener) indicating that the garage door 320 is open, the control circuitry 334 can either notify the user 308 that the garage door is open, or generate a control signal to cause the garage door opener to close the garage door 320. For example, the control circuitry 334 can send a message to the user device 310 indicating that the garage door is open. As another example, the control circuitry 334 can cause the bed 302 to vibrate. As yet another example, the control circuitry 334 can generate and transmit a control signal to cause the lighting system 314 to cause one or more lights in the bedroom to flash to alert the user 308 to check the user device 310 for an alert (in this example, an alert regarding the garage door 320 being open). Alternatively, or additionally, the control circuitry 334 can generate and transmit control signals to cause the garage door opener to close the garage door 320 in response to identifying that the user 308 is in bed for the evening and that the garage door 320 is open. In some implementations, control signals can vary depend on the age of the user 308.

The control circuitry 334 can activate additional security features based on the presence of the user in bed 302, such as motion tracking or other biometric tracking outside of the user's bedroom due to the security system knowing that the user was in bed and sleeping based on a signal from the control system. If the user wakes and gets out of bed, the additional features can be disabled until the user either is awake for their daily routine or the additional features can become re-enabled if the user returns to bed.

The control circuitry 334 can similarly send and receive communications for controlling or receiving state information associated with the door 332 or the oven 322. For example, upon detecting that the user 308 is in bed for the evening, the control circuitry 334 can generate and transmit a request to a device or system for detecting a state of the door 332. Information returned in response to the request can indicate various states for the door 332 such as open, closed but unlocked, or closed and locked. If the door 332 is open or closed but unlocked, the control circuitry 334 can alert the user 308 to the state of the door, such as in a manner described above with reference to the garage door 320. Alternatively, or in addition to alerting the user 308, the control circuitry 334 can generate and transmit control signals to cause the door 332 to lock, or to close and lock. If the door 332 is closed and locked, the control circuitry 334 can determine that no further action is needed.

Similarly, upon detecting that the user 308 is in bed for the evening, the control circuitry 334 can generate and transmit a request to the oven 322 to request a state of the oven 322 (e.g., on or off). If the oven 322 is on, the control circuitry 334 can alert the user 308 and/or generate and transmit control signals to cause the oven 322 to turn off. If the oven is already off, the control circuitry 334 can determine that no further action is necessary. In some implementations, different alerts can be generated for different events. For example, the control circuitry 334 can cause the lamp 326 (or one or more other lights, via the lighting system 314) to flash in a first pattern if the security system 318 has detected a breach, flash in a second pattern if garage door 320 is on, flash in a third pattern if the door 332 is open, flash in a fourth pattern if the oven 322 is on, and flash in a fifth pattern if another bed has detected that a user of that bed has gotten up (e.g., that a child of the user 308 has gotten out of bed in the middle of the night as sensed by a sensor in the bed 302 of the child). Other examples of alerts that can be processed by the control circuitry 334 of the bed 302 and communicated to the user include a smoke detector detecting smoke (and communicating this detection of smoke to the control circuitry 334), a carbon monoxide tester detecting carbon monoxide, a heater malfunctioning, or an alert from any other device capable of communicating with the control circuitry 334 and detecting an occurrence that should be brought to the user 308's attention.

The control circuitry 334 can also communicate with a system or device for controlling a state of the window blinds 330. For example, in response to determining that the user 308 is in bed for the evening, the control circuitry 334 can generate and transmit control signals to cause the window blinds 330 to close. As another example, in response to determining that the user 308 is up for the day (e.g., user has gotten out of bed after 6:30 am) the control circuitry 334 can generate and transmit control signals to cause the window blinds 330 to open. By contrast, if the user 308 gets out of bed prior to a normal rise time for the user 308, the control circuitry 334 can determine that the user 308 is not awake for the day and does not generate control signals for causing the window blinds 330 to open. As yet another example, the control circuitry 334 can generate and transmit control signals that cause a first set of blinds to close in response to detecting user bed presence of the user 308 and a second set of blinds to close in response to detecting that the user 308 is asleep.

The control circuitry 334 can generate and transmit control signals for controlling functions of other household devices in response to detecting user interactions with the bed 302. For example, in response to determining that the user 308 is awake for the day, the control circuitry 334 can generate and transmit control signals to the coffee maker 324 to cause the coffee maker 324 to begin brewing coffee. As another example, the control circuitry 334 can generate and transmit control signals to the oven 322 to cause the oven to begin preheating (for users that like fresh baked bread in the morning). As another example, the control circuitry 334 can use information indicating that the user 308 is awake for the day along with information indicating that the time of year is currently winter and/or that the outside temperature is below a threshold value to generate and transmit control signals to cause a car engine block heater to turn on.

As another example, the control circuitry 334 can generate and transmit control signals to cause one or more devices to enter a sleep mode in response to detecting user bed presence of the user 308, or in response to detecting that the user 308 is asleep. For example, the control circuitry 334 can generate control signals to cause a mobile phone of the user 308 to switch into sleep mode. The control circuitry 334 can then transmit the control signals to the mobile phone. Later, upon determining that the user 308 is up for the day, the control circuitry 334 can generate and transmit control signals to cause the mobile phone to switch out of sleep mode.

In some implementations, the control circuitry 334 can communicate with one or more noise control devices. For example, upon determining that the user 308 is in bed for the evening, or that the user 308 is asleep, the control circuitry 334 can generate and transmit control signals to cause one or more noise cancellation devices to activate. The noise cancellation devices can, for example, be included as part of the bed 302 or located in the bedroom with the bed 302. As another example, upon determining that the user 308 is in bed for the evening or that the user 308 is asleep, the control circuitry 334 can generate and transmit control signals to turn the volume on, off, up, or down, for one or more sound generating devices, such as a stereo system radio, computer, tablet, etc.

Additionally, functions of the bed 302 are controlled by the control circuitry 334 in response to user interactions with the bed 302. For example, the bed 302 can include an adjustable foundation and an articulation controller configured to adjust the position of one or more portions of the bed 302 by adjusting the adjustable foundation that supports the bed. For example, the articulation controller can adjust the bed 302 from a flat position to a position in which a head portion of a mattress of the bed 302 is inclined upward (e.g., to facilitate a user sitting up in bed and/or watching television). In some implementations, the bed 302 includes multiple separately articulable sections. For example, portions of the bed corresponding to the locations of the air chambers 306a and 306b can be articulated independently from each other, to allow one person positioned on the bed 302 surface to rest in a first position (e.g., a flat position) while a second person rests in a second position (e.g., a reclining position with the head raised at an angle from the waist). In some implementations, separate positions can be set for two different beds (e.g., two twin beds placed next to each other). The foundation of the bed 302 can include more than one zone that can be independently adjusted. The articulation controller can also be configured to provide different levels of massage to one or more users on the bed 302 or to cause the bed to vibrate to communicate alerts to the user 308 as described above.

The control circuitry 334 can adjust positions (e.g., incline and decline positions for the user 308 and/or an additional user of the bed 302) in response to user interactions with the bed 302. For example, the control circuitry 334 can cause the articulation controller to adjust the bed 302 to a first recline position for the user 308 in response to sensing user bed presence for the user 308. The control circuitry 334 can cause the articulation controller to adjust the bed 302 to a second recline position (e.g., a less reclined, or flat position) in response to determining that the user 308 is asleep. As another example, the control circuitry 334 can receive a communication from the television 312 indicating that the user 308 has turned off the television 312, and in response the control circuitry 334 can cause the articulation controller to adjust the position of the bed 302 to a preferred user sleeping position (e.g., due to the user turning off the television 312 while the user 308 is in bed indicating that the user 308 wishes to go to sleep).

In some implementations, the control circuitry 334 can control the articulation controller so as to wake up one user of the bed 302 without waking another user of the bed 302. For example, the user 308 and a second user of the bed 302 can each set distinct wakeup times (e.g., 6:30 am and 7:15 am respectively). When the wakeup time for the user 308 is reached, the control circuitry 334 can cause the articulation controller to vibrate or change the position of only a side of the bed on which the user 308 is located to wake the user 308 without disturbing the second user. When the wakeup time for the second user is reached, the control circuitry 334 can cause the articulation controller to vibrate or change the position of only the side of the bed on which the second user is located. Alternatively, when the second wakeup time occurs, the control circuitry 334 can utilize other methods (such as audio alarms, or turning on the lights) to wake the second user since the user 308 is already awake and therefore will not be disturbed when the control circuitry 334 attempts to wake the second user.

Still referring to FIG. 3, the control circuitry 334 for the bed 302 can utilize information for interactions with the bed 302 by multiple users to generate control signals for controlling functions of various other devices. For example, the control circuitry 334 can wait to generate control signals for, for example, engaging the security system 318, or instructing the lighting system 314 to turn off lights in various rooms until both the user 308 and a second user are detected as being present on the bed 302. As another example, the control circuitry 334 can generate a first set of control signals to cause the lighting system 314 to turn off a first set of lights upon detecting bed presence of the user 308 and generate a second set of control signals for turning off a second set of lights in response to detecting bed presence of a second user. As another example, the control circuitry 334 can wait until it has been determined that both the user 308 and a second user are awake for the day before generating control signals to open the window blinds 330. As yet another example, in response to determining that the user 308 has left the bed and is awake for the day, but that a second user is still sleeping, the control circuitry 334 can generate and transmit a first set of control signals to cause the coffee maker 324 to begin brewing coffee, to cause the security system 318 to deactivate, to turn on the lamp 326, to turn off the nightlight 328, to cause the thermostat 316 to raise the temperature in one or more rooms to 72 degrees, and to open blinds (e.g., the window blinds 330) in rooms other than the bedroom in which the bed 302 is located. Later, in response to detecting that the second user is no longer present on the bed (or that the second user is awake) the control circuitry 334 can generate and transmit a second set of control signals to, for example, cause the lighting system 314 to turn on one or more lights in the bedroom, to cause window blinds in the bedroom to open, and to turn on the television 312 to a pre-specified channel.

Examples of a Remote Control for a Bed

FIGS. 4A-4D are schematic diagrams of the example remote control 122 that can be associated with the bed system, including those described above with respect to FIGS. 1-3. The remote control 122 is substantially similar to the remote control 122. Referring to FIGS. 4A-4D, the remote control 122 includes a case 402. The case 402 is the outer body of the remote control 122.

Figure 4A:
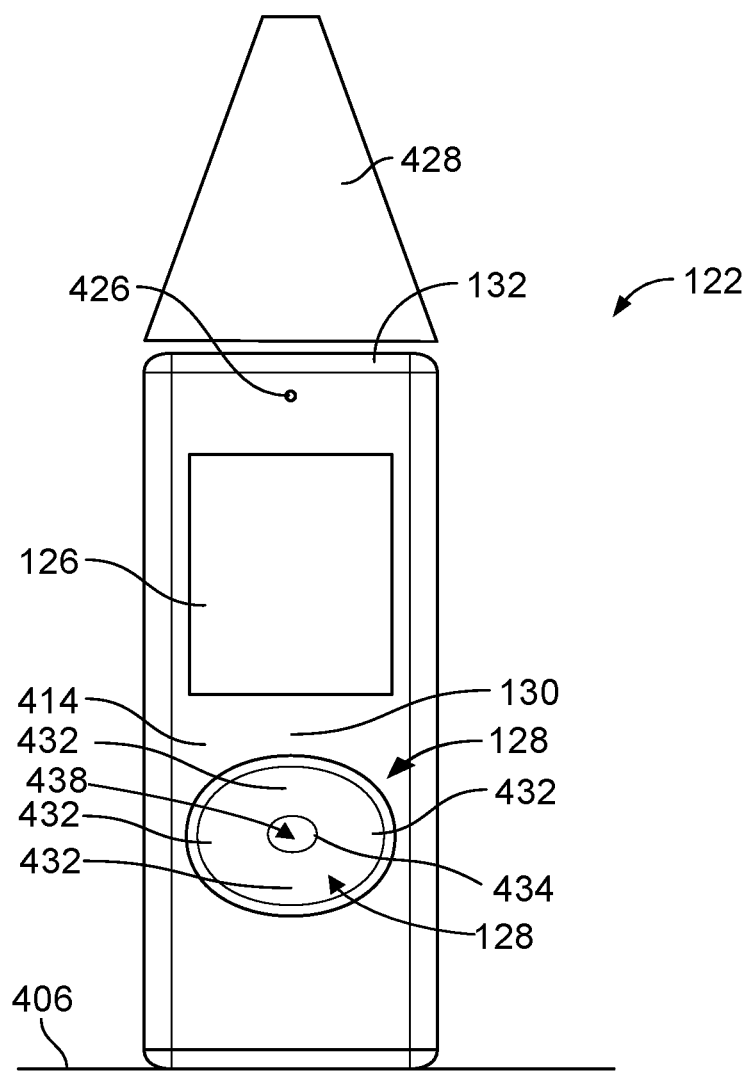
FIGS. 4A-4E are perspective schematic diagrams of the example remote control of the air bed system.
Figure 4B:
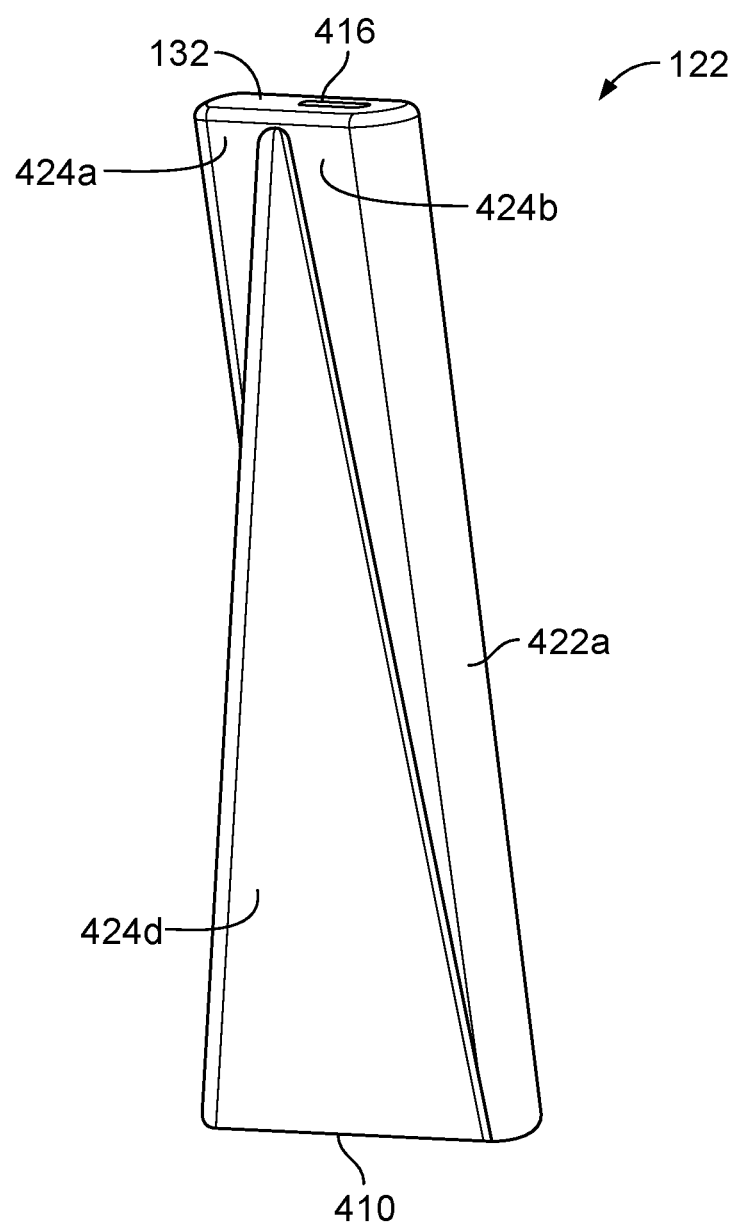
Figure 4C:
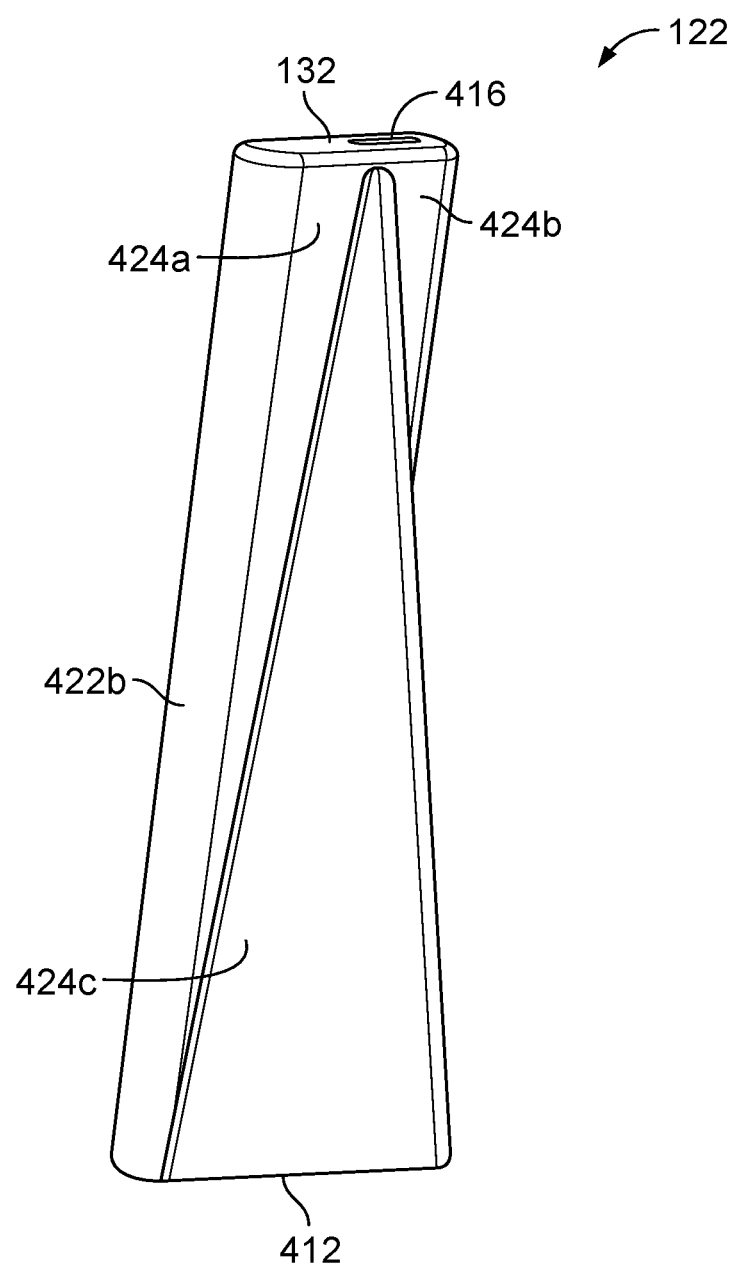
Figure 4D:
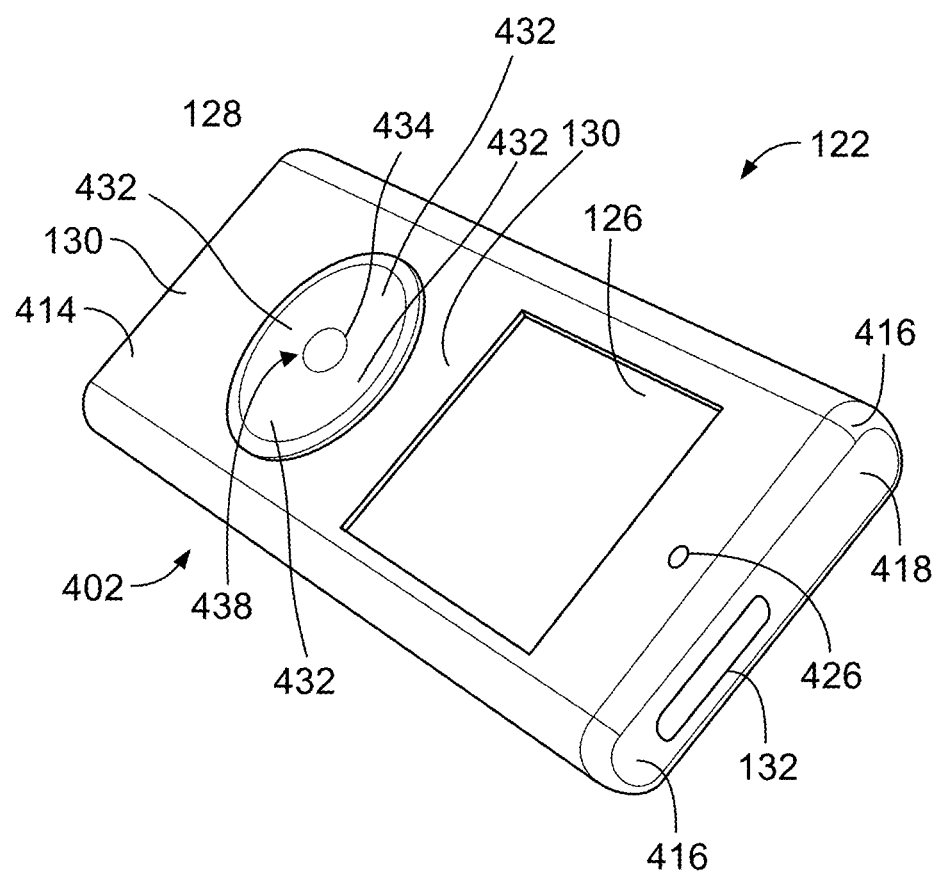
Figure 4E:
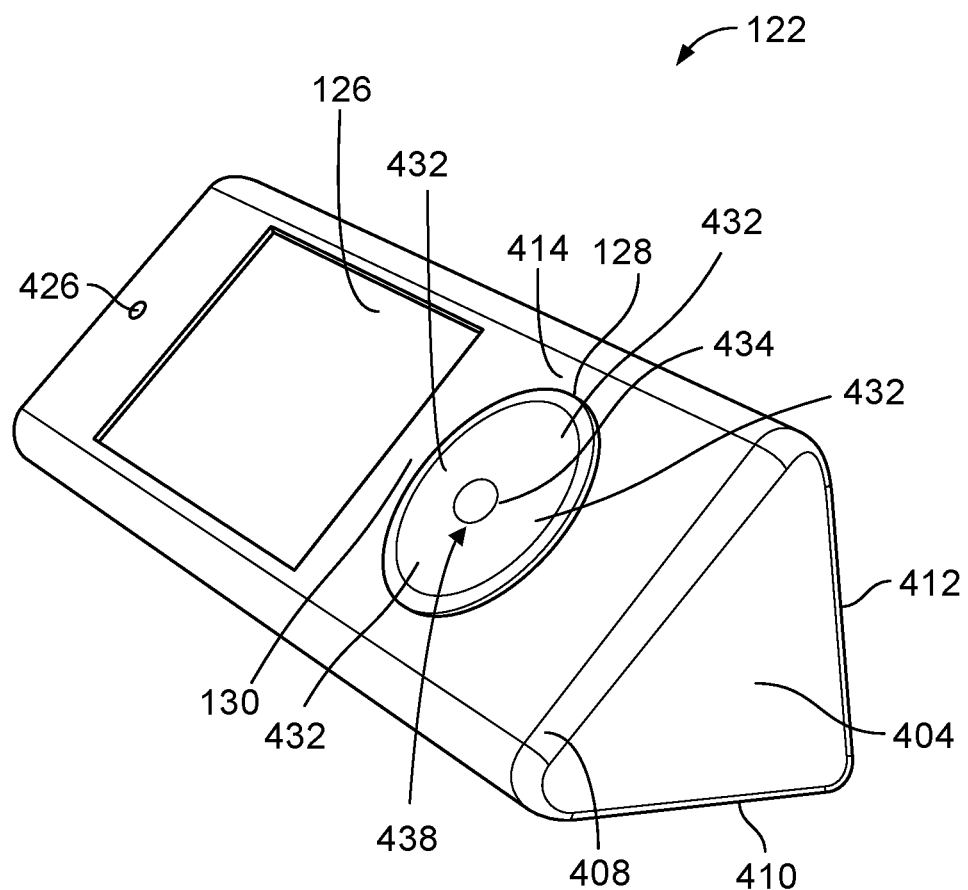

As shown in FIG. 4E, the case 402 is defined by a base surface 404. In some implementations, as shown in FIG. 4E, the base surface 404 is sized to allow the remote control 122 to rest in a vertical position on a horizontal surface 406 (seen in FIG. 4A). For example, referring to FIG. 3, the remote control 122 can rest in the vertical (upright) position on the top (horizontal) surface of the bedside table 340. Referring to FIG. 4E, in some implementations, the base surface 404 is substantially triangular. The triangular base surface 404 is defined by a first edge 408, a second edge 410, and a third edge 412.

The case 402 is further defined by a display surface 414, as shown in FIGS. 4A, 4D, and 4E. The display surface 414 can also be referred to as the front surface or the front of the case 402. The display surface 414 is coupled to the base surface 404 by the first edge 408. The display surface 414 includes the display 126 previously described in reference to FIGS. 1-3. The display 126 can also be referred to as the display screen.

The display 126 can be an input area 128 as previously stated. When the display 126 is an input area 128, the display 126 can include portions which correspond to a digital button or digital buttons (not shown), that, when physically contacted by the user, can control operations of the bed 112. For example, the user can control the position or configuration of the bed, the pressure of the bed, the temperature of the bed, or a light level of the bed 122. In some cases, the digital buttons can change based on the user selected menu, list, or command. For example, the digital button can be a single main menu button, or the digital buttons can be the main menu button and a sub-menu button.

The display surface 414 also includes the input area 128, as previously described in reference to FIGS. 1-3. In some implementations, the input area 128 is a direction pad 432 and a selection pad 434. The direction pad 432 moves a cursor or selection icon (not shown) on the display 126 when the user applies a force to a respective area of the direction pad 432. In response, the cursor on the display 126 moves in the respective direction. When the remote control 122 is in a sleep state and user touches the input area 128, the input area 128 senses the touch of the user, the input area 128 generates a signal to the control circuitry 334 of the remote control 122 to wake the remote control 122. The operation of the remote control 122, in response to the signal to wake up from input area 128, is substantially similar to the operation of the capacitive button 130 is described below in reference FIG. 21. Waking up the remote control 122 by the user touching the capacitive button 130 can be referred to as "push to wake". The direction pad 432 can be an outer portion 436 of the input area 128. The selection pad 434 can be a center portion 438 of the input area 128.

The display surface 414 includes at least one capacitive button 130, described previously in reference to FIGS. 1-3. The capacitive button 130 can correspond to a capacitive zone or capacitive area of the remote control 122. The capacitive button 130 senses the touch of the user by the transmission (conduction) of an electrical charge from the user to the capacitive button 130. Alternatively, the transmission of the electrical charge can be from the capacitive button 130 to the user.

When the capacitive button 130 senses the touch of the user, the capacitive button generates a signal to the control circuitry 334 of the remote control 122 to wake the remote control 122. The operation of the remote control 122 in response to the signal to wake up from the capacitive button 130 is described below in reference FIG. 21. Waking up the remote control 122 by the user touching the capacitive button 130 can be referred to as "grip to wake".

In some implementations, at least one of the capacitive buttons 130 is positioned between the display 126 and the input area 128. The capacitive button 130 is positioned between the display 126 and the input area 128 for improved ergonomics for the user.

Referring to FIG. 4D, the case 402 includes an upper surface 416. The upper surface 416 is coupled to the display surface 414. The upper surface 416 is a rounded rectangle.

The upper surface 416 includes the slider switch 132, as previously described in reference to FIGS. 1-3. The slider switch 132 moves (e.g. words toggles) between a first position 416 and a second position 418. In some implementations, as shown in reference to FIGS. 3 and 4A-4D, the slider switch 132 adjusts an interface displayed on the display 126 to a first side 336 of the bed 302 when the slider switch 132 is in the first position 416 and a second side 338 of the bed 302 when the slider switch 132 is in the second position 418.

As shown in FIGS. 4B and 4C, the case 402 is further defined by a back surface 420. The back surface 420 is coupled to the base surface 404, the display surface 414, and the upper surface 416. The edges 422a and 422b connecting the display surface 414 to the back surface 420 are rounded. The back surface 420 includes four flat triangular surfaces 424a-d.

A portion 430 of the back surface 420 is removable. The portion 430 of the back surface 420 can be removed to access the internal portions (not shown) of the remote control 122.

The remote control 122 includes a power source (not shown). The portion 430 of the back surface 420 can be removed to access the power source. The power source provides power to the control circuitry 334 to operate the remote control 122. The power source can be a battery. For example, the power source can be a commercially available off the shelf alkaline battery such as CR3032, AA, AAA, C, D, and CR1016 batteries. Alternatively or in addition, the power source can be a removable rechargeable battery, a super capacitor, or a fixed rechargeable battery, for example, that can be charged by a universal serial bus (USB) connection.

In some implementations, a portion of the case 402 is metallic. For example, the display surface 414 or the edges 422a and 422b can be metallic. In some implementations, the case 402 is capacitively sensitive. By capacitively sensitive, it is meant that the remote control 122 wakes up responsive to a signal from the capacitively sensitive case. For example, when the remote control 122 is in a rest state (no processing functions are occurring and/or the battery is in a low power mode) and the user touches the capacitively sensitive case, a processor in the remote control transitions from a sleep state to a wake state due to the change in capacitance resulting from the user touch. In the wake state, the remote control 122 is ready to receive input from the user to control the bed 112. For example, the display surface 414, the capacitive button 130, or the edges 422a and 422b can be capacitively sensitive.

In some implementations, as shown in FIGS. 4A, 4D, and 4E, the remote control 122 includes a light sensor 426. FIG. 20 is a flow chart of an example method of operating the light sensor 426 of the remote control 122. Referring to FIGS. 4A, 4D, 4E, and 19, at 2002, the light sensor 426 receives ambient light 428. At 2004, the light sensor 426 produces a signal representative of an ambient light 428 level (in other words intensity or brightness). The signal is a light signal produced by the light sensor 426.

After the light signal is produced (transmitted), at 2006, it is then interpreted by the remote control 122 to adjust a brightness of the display 126 and the input area 128. The initial brightness of the display area 126 and the input area 128 can be preset and/or stored in the controller 122 (stored locally). Alternatively, the remote control 122 can fetch a user desired brightness of the display area 126 and the input area 128 from the control circuitry 324 of the bed 112 (stored centrally). The user desired brightness of the display area 126 and the input area 128 adjusts how the remote control 122 adjusts the display area 126 and input area 128 brightness relative to the light signal produced from light sensor 426. When the user chooses a brighter initial brightness of the display area 126 and the input area 128, the remote control 122 will maintain that brightness relative to the ambient environment. The process occurs for medium and low user desired brightness, relevant to the ambient light of the environment as detected by the light sensor 426.

Figure 21:
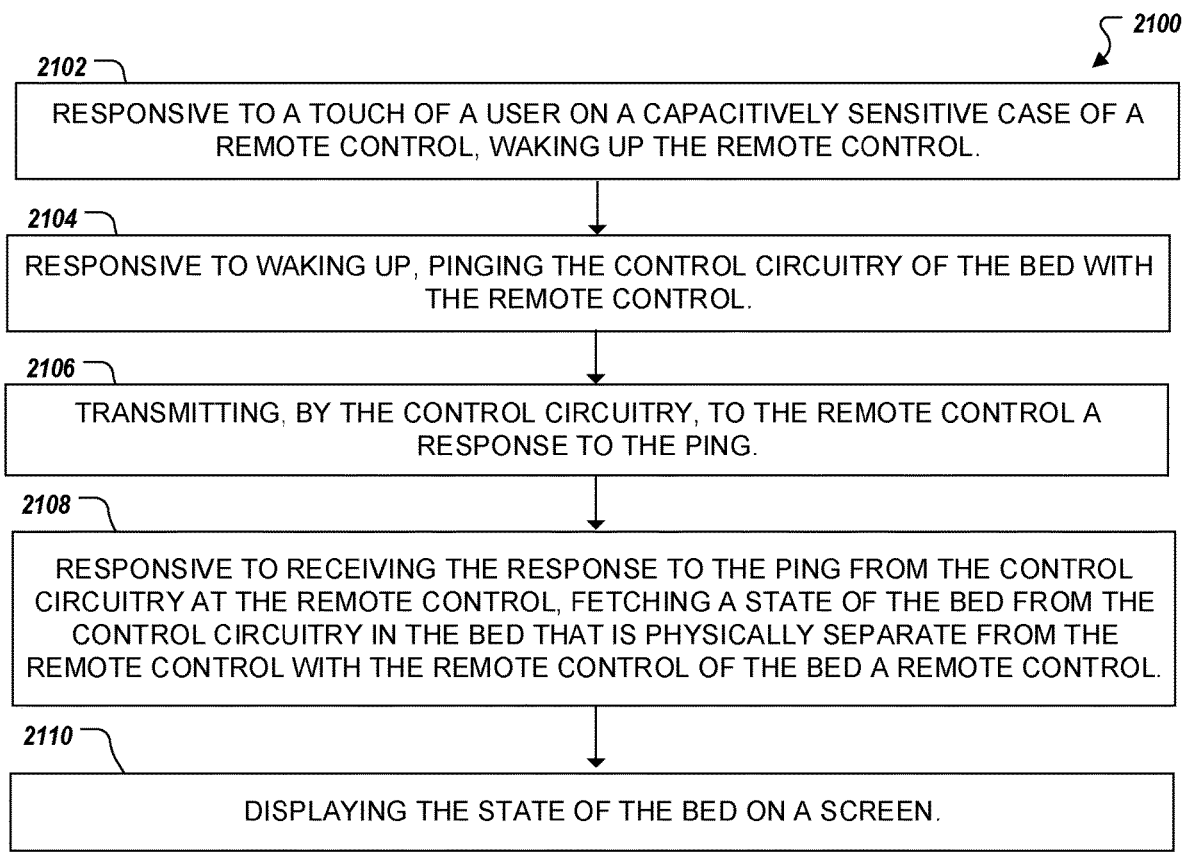
FIG. 21 is a flow chart of an example method of operating a bed system with a remote control.

FIG. 21 is a flow chart of an example method of operating a bed system with a remote control. Referring to FIGS. 1-3, and 21, at 2102 the remote control 122 of the bed 302 system in the example environment 300 the remote control 122 wakes up responsive to the touch of the user. When the user touches the capacitively sensitive case 402 (i.e. the capacitive button 130), the capacitively sensitive case 402 sends a signal to the remote control 122 to wake up. At 2104, responsive to waking up, the remote control 122 pings the control circuitry 334 of the bed. The remote control 122 pings the control circuitry 334 as a communications check to verify the bed 112 is within a communications range of the remote 122 and to verify a communications channel is available for the remote control 122 to communicate with the bed 112.

At 2106, the control circuitry 334 responds to the ping by transmitting a response to the remote control 122. For example, the response from control circuitry 334 to the remote control 122 can be that the bed 112 is within communications range of the remote control 122 and a communications channel is available. Alternatively, the response from control circuitry 334 to the remote control 122 can be that the bed 112 is within communications range of the control circuitry 334, but no communications channel is available. Alternatively, when the bed 112 is out of communications range from the remote control 122, the control circuitry 334 will not respond.

At 2108, responsive to receiving the response to the ping from the control circuitry 334 at the remote control 122, the remote control fetches a state of the bed 302 from the control circuitry 334 in the bed 302 that is physically separate from the remote control 122. In some implementations, the remote control 122 fetches the state of the bed 302 when waking up, as described earlier in reference to FIGS. 1-4D. In some implementations, the remote control 122 fetches the state of the bed 302 by communicating wirelessly with the control circuitry 334 of the bed 302 (the bed controller).

In some implementations, the remote control 122 pings the control circuitry 334 (the bed controller). The remote control then receives a response from the control circuitry 334 of the bed (302) in response to the ping.

At 2110, the remote control 122 displays the state of the bed 112 on a screen (the display 126) of the remote control 122 responsive to the fetched state. In some implementations, receiving a response at the remote control 122 from the control circuitry 334 of the bed 302 includes receiving an indication of a new state and displaying an interface on the display 126 includes displaying an interface appropriate for the new state. For example, the new state can be a pressure of the bed 302, a position of a portion of the bed 302 (a left side, a right side, a top portion, or a bottom portion), and/or a temperature, a light level, an error state. The new state can be all of the states of the bed. In some cases, only a relevant (user selected state) is fetched and displayed. In other cases, only states which have changed are fetched and displayed.

In some implementations, receiving a response at the remote control 122 from the control circuitry 334 of the bed 302 includes receiving an indication of no change in state since a previous ping. In such cases, the interface continues to display the last used interface.

Examples of Data Processing Systems Associated with a Bed

Described here are examples of systems and components that can be used for data processing tasks that are, for example, associated with a bed. In some cases, multiple examples of a particular component or group of components are presented. Some of these examples are redundant and/or mutually exclusive alternatives. Connections between components are shown as examples to illustrate possible network configurations for allowing communication between components. Different formats of connections can be used as technically needed or desired. The connections generally indicate a logical connection that can be created with any technologically feasible format. For example, a network on a motherboard can be created with a printed circuit board, wireless data connections, and/or other types of network connections. Some logical connections are not shown for clarity. For example, connections with power supplies and/or computer readable memory may not be shown for clarities sake, as many or all elements of a particular component may need to be connected to the power supplies and/or computer readable memory.

Figure 5A:
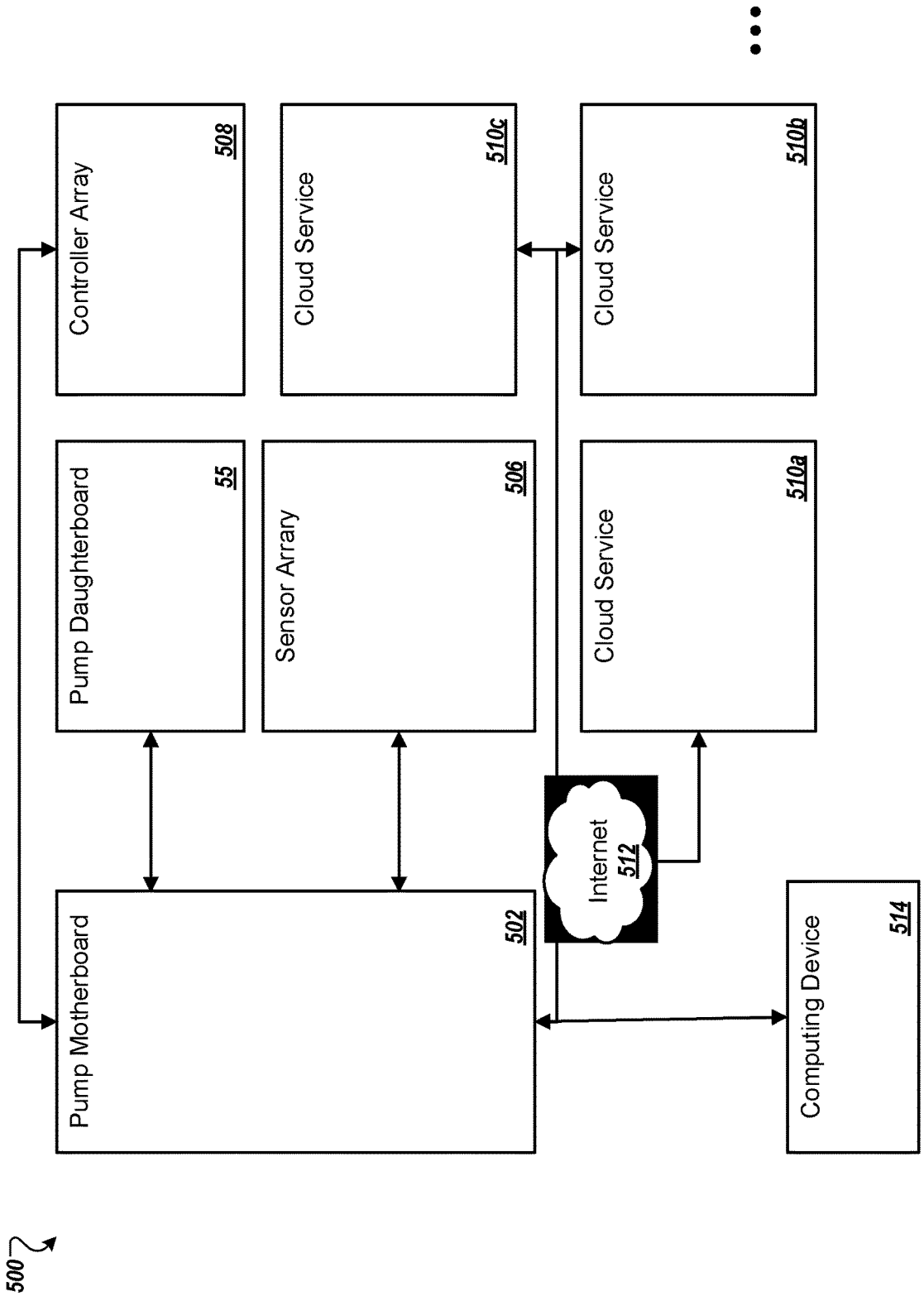
FIGS. 5A and 5B are block diagrams of example data processing systems that can be associated with a bed.

FIG. 5A is a block diagram of an example of a data processing system 500 that can be associated with a bed system, including those described above with respect to FIGS. 1-4. This system 500 includes a pump motherboard 502 and a pump daughterboard 504. The system 500 includes a sensor array 506 that can include one or more sensors configured to sense physical phenomenon of the environment and/or bed, and to report such sensing back to the pump motherboard 502 for, for example, analysis. The system 500 also includes a controller array 508 that can include one or more controllers configured to control logic-controlled devices of the bed and/or environment. The pump motherboard 500 can be in communication with one or more computing devices 514 and one or more cloud services 510 over local networks, the Internet 512, or otherwise as is technically appropriate. Each of these components will be described in more detail, some with multiple example configurations, below.

In this example, a pump motherboard 502 and a pump daughterboard 504 are communicably coupled. They can be conceptually described as a center or hub of the system 500, with the other components conceptually described as spokes of the system 500. In some configurations, this can mean that each of the spoke components communicates primarily or exclusively with the pump motherboard 502. For example, a sensor of the sensor array may not be configured to, or may not be able to, communicate directly with a corresponding controller. Instead, each spoke component can communicate with the motherboard 502. The sensor of the sensor array 406 can report a sensor reading to the motherboard 502, and the motherboard 502 can determine that, in response, a controller of the controller array 408 should adjust some parameters of a logic controlled device or otherwise modify a state of one or more peripheral devices. In one case, if the temperature of the bed is determined to be too hot, the pump motherboard 502 can determine that a temperature controller should cool the bed.

One advantage of a hub-and-spoke network configuration, sometimes also referred to as a star-shaped network, is a reduction in network traffic compared to, for example, a mesh network with dynamic routing. If a particular sensor generates a large, continuous stream of traffic, that traffic may only be transmitted over one spoke of the network to the motherboard 502. The motherboard 502 can, for example, marshal that data and condense it to a smaller data format for retransmission for storage in a cloud service 510. Additionally or alternatively, the motherboard 502 can generate a single, small, command message to be sent down a different spoke of the network in response to the large stream. For example, if the large stream of data is a pressure reading that is transmitted from the sensor array 506 a few times a second, the motherboard 502 can respond with a single command message to the controller array to increase the pressure in an air chamber. In this case, the single command message can be orders of magnitude smaller than the stream of pressure readings.

As another advantage, a hub-and-spoke network configuration can allow for an extensible network that can accommodate components being added, removed, failing, etc. This can allow, for example, more, fewer, or different sensors in the sensor array 506, controllers in the controller array 508, computing devices 514, and/or cloud services 510. For example, if a particular sensor fails or is deprecated by a newer version of the sensor, the system 500 can be configured such that only the motherboard 502 needs to be updated about the replacement sensor. This can allow, for example, product differentiation where the same motherboard 502 can support an entry level product with fewer sensors and controllers, a higher value product with more sensors and controllers, and customer personalization where a customer can add their own selected components to the system 500.

Additionally, a line of air bed products can use the system 500 with different components. In an application in which every air bed in the product line includes both a central logic unit and a pump, the motherboard 502 (and optionally the daughterboard 504) can be designed to fit within a single, universal housing. Then, for each upgrade of the product in the product line, additional sensors, controllers, cloud services, etc., can be added. Design, manufacturing, and testing time can be reduced by designing all products in a product line from this base, compared to a product line in which each product has a bespoke logic control system.

Each of the components discussed above can be realized in a wide variety of technologies and configurations. Below, some examples of each component will be further discussed.

In some alternatives, two or more of the components of the system 500 can be realized in a single alternative component; some components can be realized in multiple, separate components; and/or some functionality can be provided by different components.

Figure 5B:
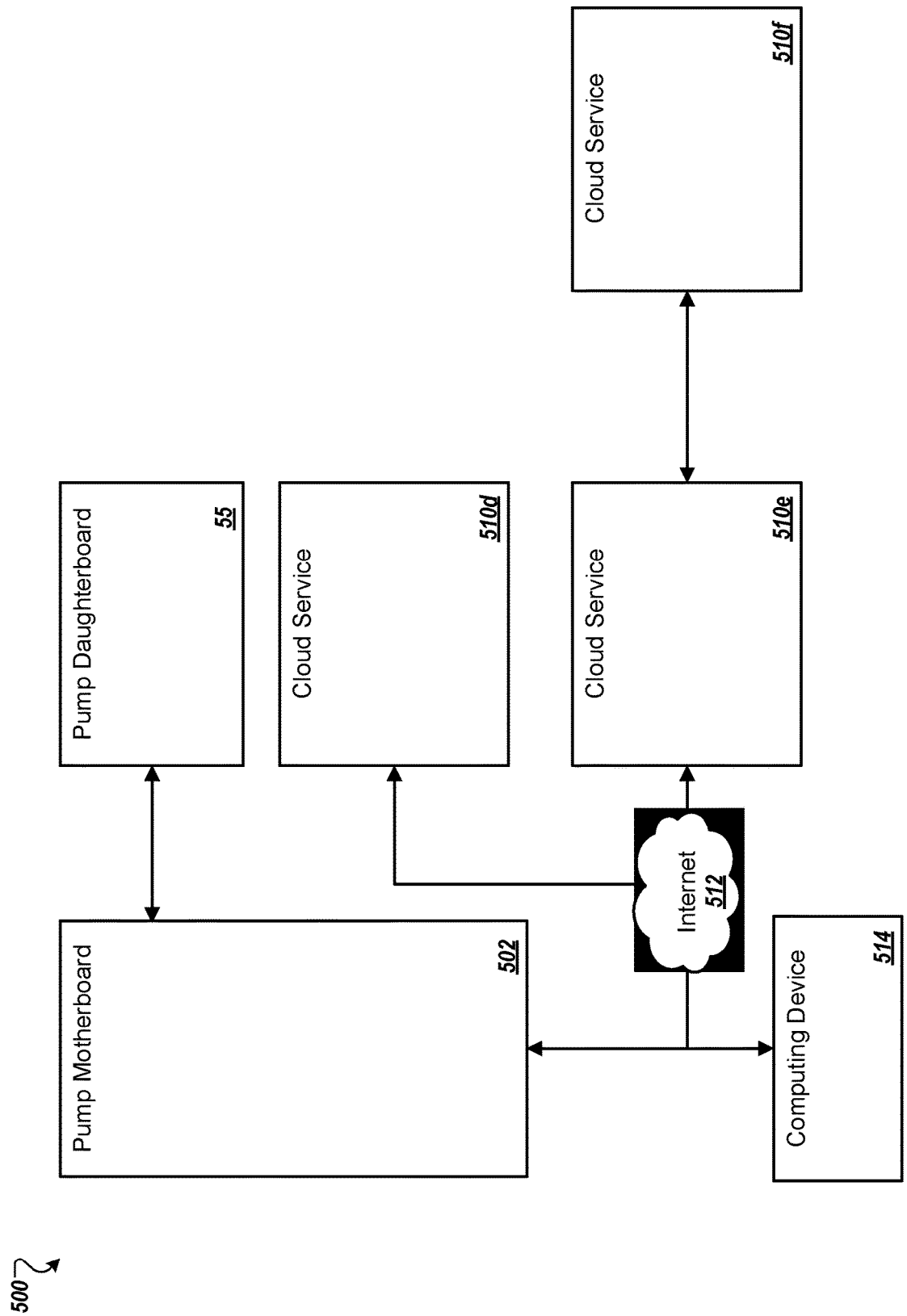

FIG. 5B is a block diagram showing some communication paths of the data processing system 500. As previously described, the motherboard 502 and the pump daughterboard 504 may act as a hub for peripheral devices and cloud services of the system 500. In cases in which the pump daughterboard 504 communicates with cloud services or other components, communications from the pump daughterboard 504 may be routed through the pump motherboard 502. This may allow, for example, the bed to have only a single connection with the internet 512. The computing device 514 may also have a connection to the internet 512, possibly through the same gateway used by the bed and/or possibly through a different gateway (e.g., a cell service provider).

Previously, a number of cloud services 510 were described. As shown in FIG. 5B, some cloud services, such as cloud services 510*d* and 510*e,* may be configured such that the pump motherboard 502 can communicate with the cloud service directly—that is the motherboard 502 may communicate with a cloud service 510 without having to use another cloud service 510 as an intermediary. Additionally or alternatively, some cloud services 510, for example cloud service 510*f,* may only be reachable by the pump motherboard 502 through an intermediary cloud service, for example cloud service 510*e*. While not shown here, some cloud services 510 may be reachable either directly or indirectly by the pump motherboard 502.

Additionally, some or all of the cloud services 510 may be configured to communicate with other cloud services. This communication may include the transfer of data and/or remote function calls according to any technologically appropriate format. For example, one cloud service 510 may request a copy for another cloud service's 510 data, for example, for purposes of backup, coordination, migration, or for performance of calculations or data mining. In another example, many cloud services 510 may contain data that is indexed according to specific users tracked by the user account cloud 510*c* and/or the bed data cloud 510*a*. These cloud services 510 may communicate with the user account cloud 510*c* and/or the bed data cloud 510*a* when accessing data specific to a particular user or bed.

Figure 6:
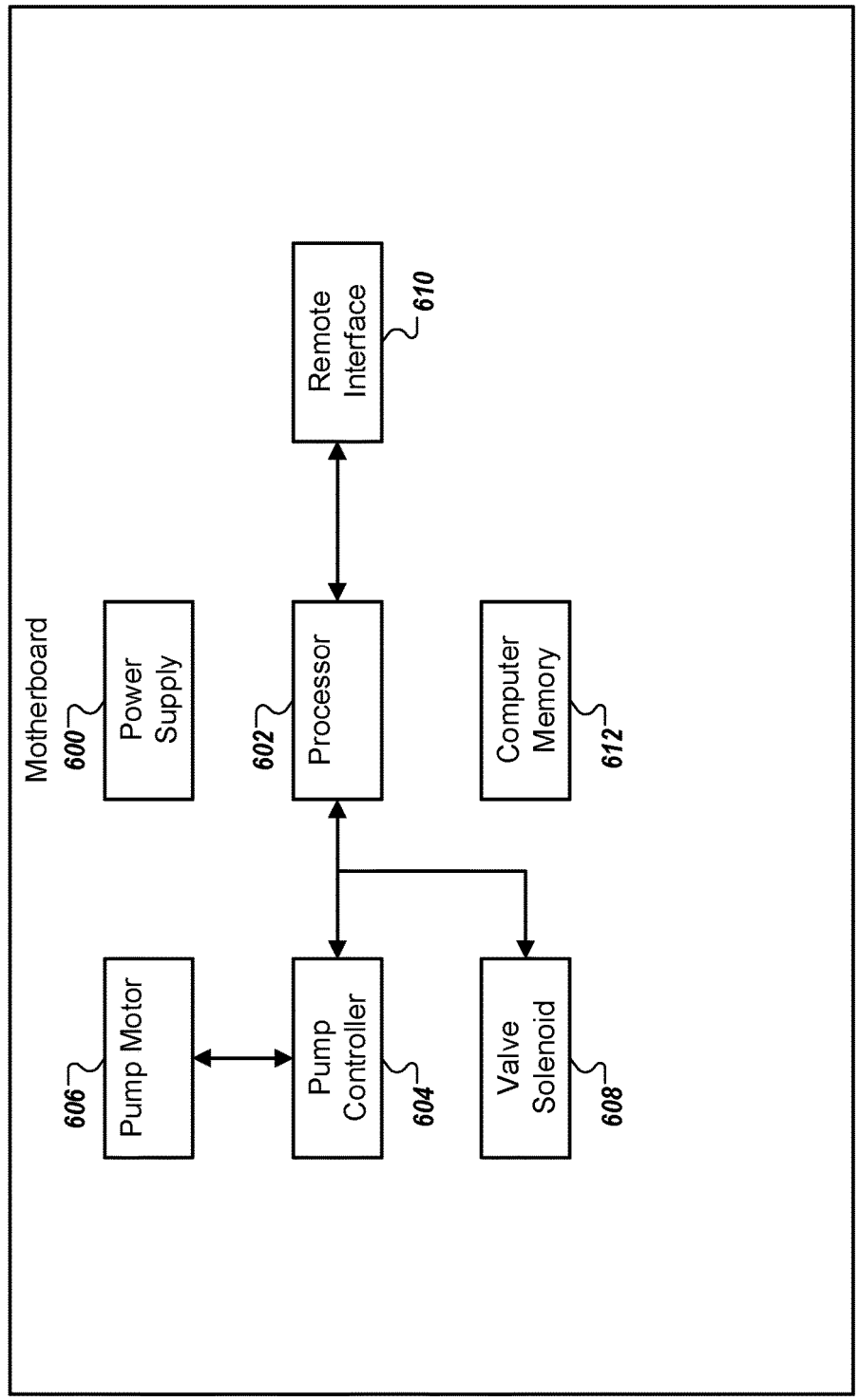
FIGS. 6 and 7 are block diagrams of examples of motherboards that can be used in a data processing system that can be associated with a bed.

FIG. 6 is a block diagram of an example of a motherboard 402 that can be used in a data processing system that can be associated with a bed system, including those described above with respect to FIGS. 1-4E. In this example, compared to other examples described below, this motherboard 502 consists of relatively fewer parts and can be limited to provide a relatively limited feature set.

The motherboard includes a power supply 600, a processor 602, and computer memory 612. In general, the power supply includes hardware used to receive electrical power from an outside source and supply it to components of the motherboard 502. The power supply can include, for example, a battery pack and/or wall outlet adapter, an AC to DC converter, a DC to AC converter, a power conditioner, a capacitor bank, and/or one or more interfaces for providing power in the current type, voltage, etc., needed by other components of the motherboard 502.

The processor 602 is generally a device for receiving input, performing logical determinations, and providing output. The processor 602 can be a central processing unit, a microprocessor, general purpose logic circuity, application-specific integrated circuity, a combination of these, and/or other hardware for performing the functionality needed.

The memory 612 is generally one or more devices for storing data. The memory 612 can include long term stable data storage (e.g., on a hard disk), short term unstable (e.g., on Random Access Memory) or any other technologically appropriate configuration.

The motherboard 402 includes a pump controller 604 and a pump motor 606. The pump controller 604 can receive commands from the processor 602 and, in response, control the function of the pump motor 606. For example, the pump controller 604 can receive, from the processor 602, a command to increase the pressure of an air chamber by 0.3 pounds per square inch (PSI). The pump controller 604, in response, engages a valve so that the pump motor 606 is configured to pump air into the selected air chamber, and can engage the pump motor 606 for a length of time that corresponds to 0.3 PSI or until a sensor indicates that pressure has been increased by 0.3 PSI. In an alternative configuration, the message can specify that the chamber should be inflated to a target PSI, and the pump controller 604 can engage the pump motor 606 until the target PSI is reached.

A valve solenoid 608 can control which air chamber a pump is connected to. In some cases, the solenoid 608 can be controlled by the processor 602 directly. In some cases, the solenoid 608 can be controlled by the pump controller 604.

A remote interface 610 of the motherboard 402 can allow the motherboard 402 to communicate with other components of a data processing system. For example, the motherboard 502 can be able to communicate with one or more daughterboards, with peripheral sensors, and/or with peripheral controllers through the remote interface 610. The remote interface 610 can provide any technologically appropriate communication interface, including but not limited to multiple communication interfaces such as WiFi, Bluetooth, and copper-wired networks.

Figure 7:
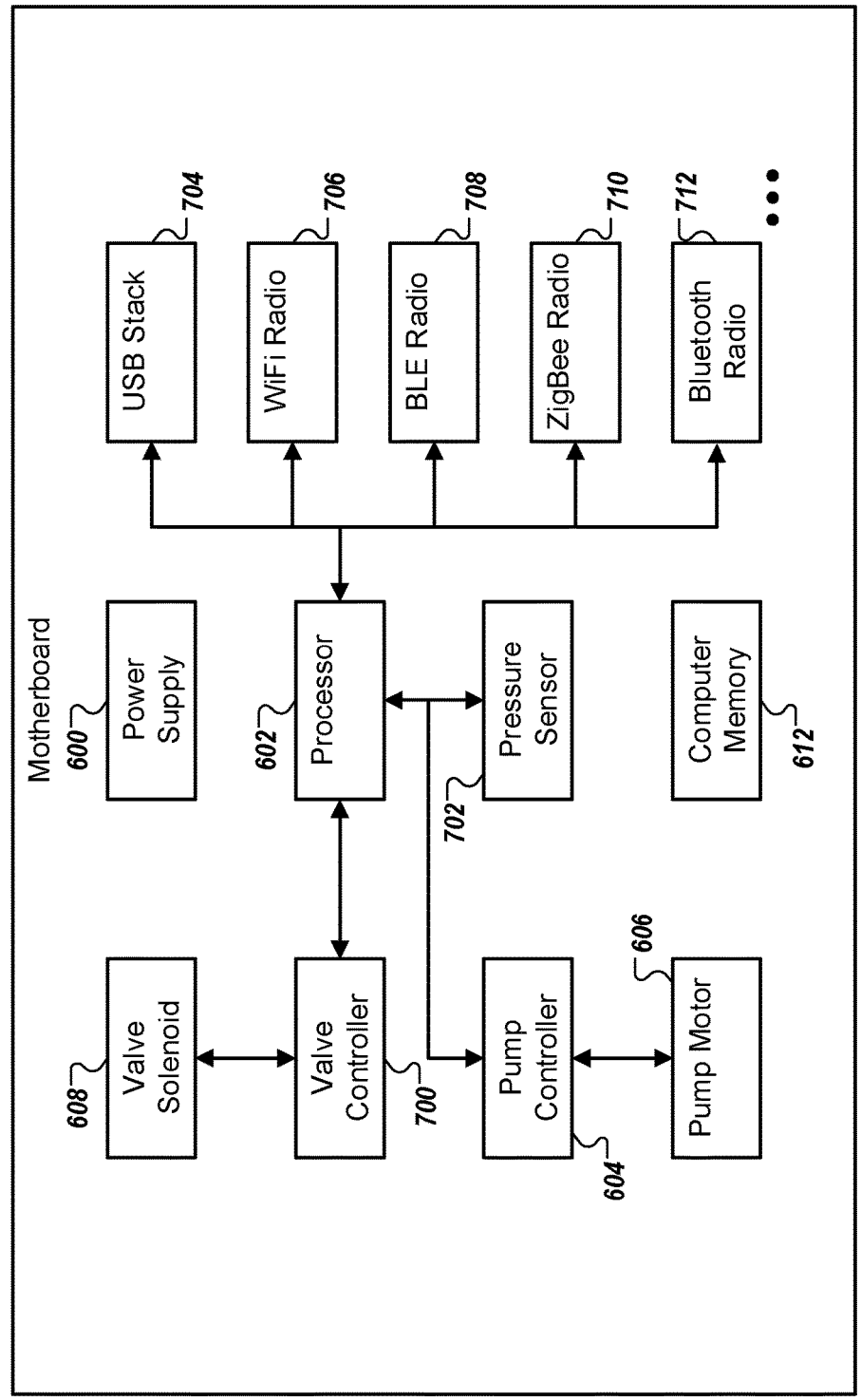

FIG. 7 is a block diagram of an example of a motherboard 502 that can be used in a data processing system that can be associated with a bed system, including those described above with respect to FIGS. 1-4E. Compared to the motherboard 502 described with reference to FIG. 6, the motherboard in FIG. 7 can contain more components and provide more functionality in some applications.

In addition to the power supply 600, processor 602, pump controller 604, pump motor 606, and valve solenoid 608, this motherboard 502 is shown with a valve controller 700, a pressure sensor 702, a universal serial bus (USB) stack 704, a WiFi radio 706, a Bluetooth Low Energy (BLE) radio 708, a ZigBee radio 710, a Bluetooth radio 712 and a computer memory 612.

Similar to the way that the pump controller 604 converts commands from the processor 602 into control signals for the pump motor 606, the valve controller 700 can convert commands from the processor 602 into control signals for the valve solenoid 608.

In one example, the processor 602 can issue a command to the valve controller 700 to connect the pump to a particular air chamber out of the group of air chambers in an air bed. The valve controller 700 can control the position of the valve solenoid 608 so that the pump is connected to the indicated air chamber.

The pressure sensor 702 can read pressure readings from one or more air chambers of the air bed. The pressure sensor 702 can also preform digital sensor conditioning.

The motherboard 502 can include a suite of network interfaces, including but not limited to those shown here. These network interfaces can allow the motherboard to communicate over a wired or wireless network with any number of devices, including but not limited to peripheral sensors, peripheral controllers, computing devices, and devices and services connected to the Internet 512.

Figure 8:
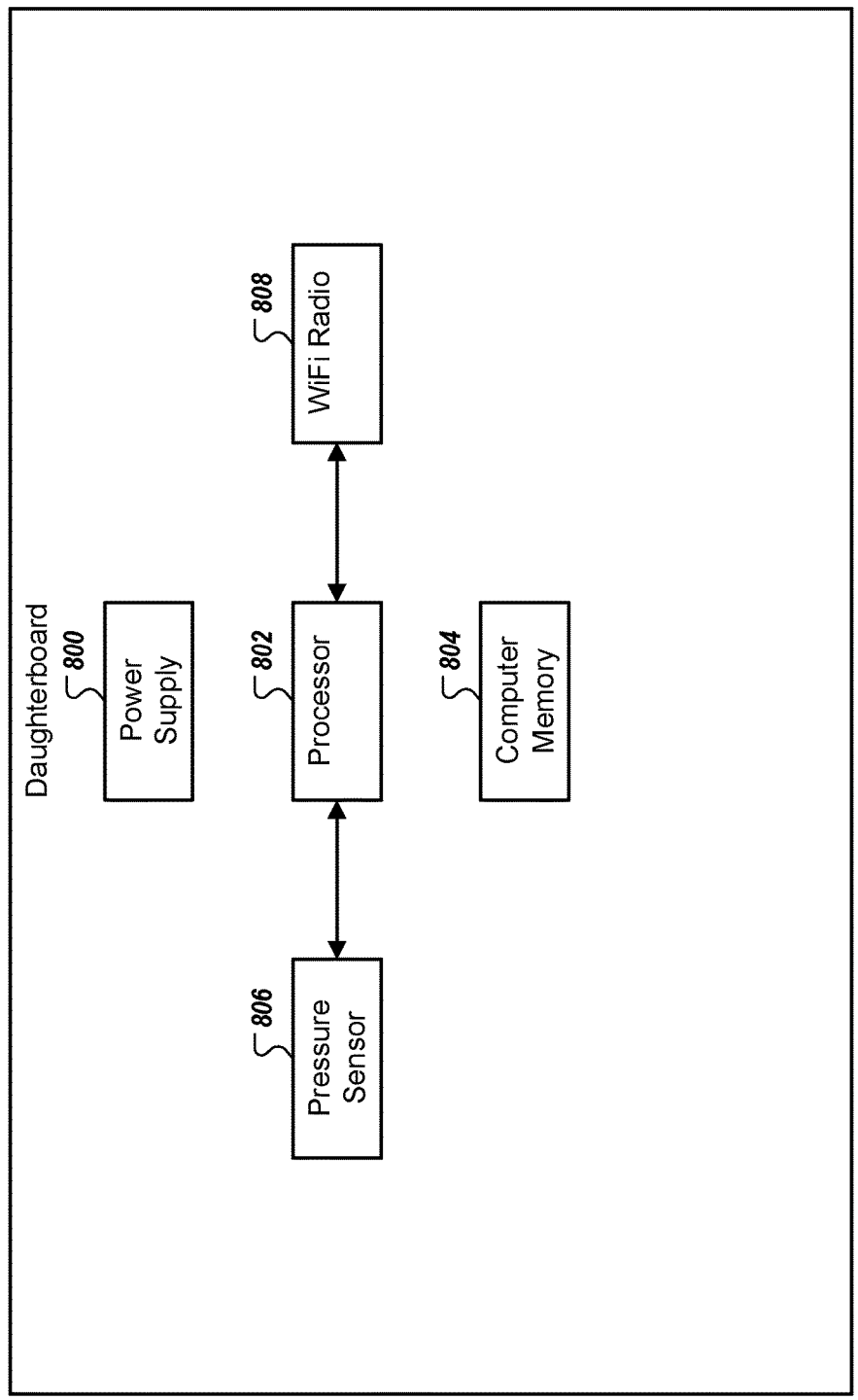
FIG. 8 is a block diagram of an example of a daughterboard that can be used in a data processing system that can be associated with a bed.

FIG. 8 is a block diagram of an example of a daughterboard 504 that can be used in a data processing system that can be associated with a bed system, including those described above with respect to FIGS. 1-4E. In some configurations, one or more daughterboards 504 can be connected to the motherboard 502. Some daughterboards 504 can be designed to offload particular and/or compartmentalized tasks from the motherboard 502. This can be advantageous, for example, if the particular tasks are computationally intensive, proprietary, or subject to future revisions. For example, the daughterboard 504 can be used to calculate a particular sleep data metric. This metric can be computationally intensive, and calculating the sleep metric on the daughterboard 504 can free up the resources of the motherboard 502 while the metric is being calculated. Additionally and/or alternatively, the sleep metric can be subject to future revisions. To update the system 500 with the new sleep metric, it is possible that only the daughterboard 504 that calculates that metric need be replaced. In this case, the same motherboard 502 and other components can be used, saving the need to perform unit testing of additional components instead of just the daughterboard 504.

The daughterboard 504 is shown with a power supply 800, a processor 802, computer readable memory 804, a pressure sensor 806, and a WiFi radio 808. The processor can use the pressure sensor 806 to gather information about the pressure of the air chamber or chambers of an air bed. From this data, the processor 802 can perform an algorithm to calculate a sleep metric. In some examples, the sleep metric can be calculated from only the pressure of air chambers. In other examples, the sleep metric can be calculated from one or more other sensors. In an example in which different data is needed, the processor 802 can receive that data from an appropriate sensor or sensors. These sensors can be internal to the daughterboard 504, accessible via the WiFi radio 808, or otherwise in communication with the processor 802. Once the sleep metric is calculated, the processor 802 can report that sleep metric to, for example, the motherboard 502.

Figure 9:
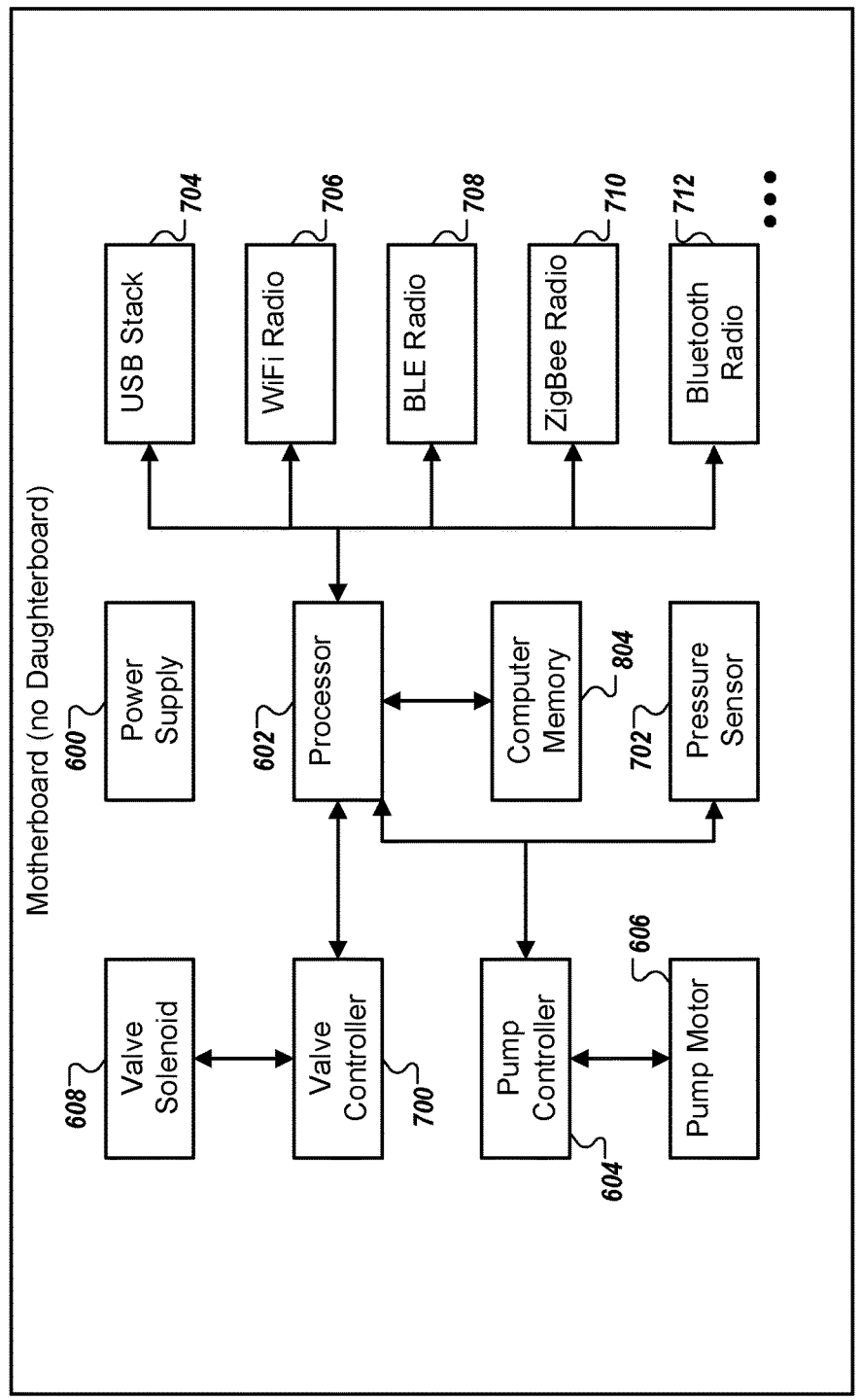
FIG. 9 is a block diagram of an example of a motherboard with no daughterboard that can be used in a data processing system that can be associated with a bed.

FIG. 9 is a block diagram of an example of a motherboard 900 with no daughterboard that can be used in a data processing system that can be associated with a bed system, including those described above with respect to FIGS. 1-4E. In this example, the motherboard 900 can perform most, all, or more of the features described with reference to the motherboard 502 in FIG. 7 and the daughterboard 504 in FIG. 8.

Figure 10:
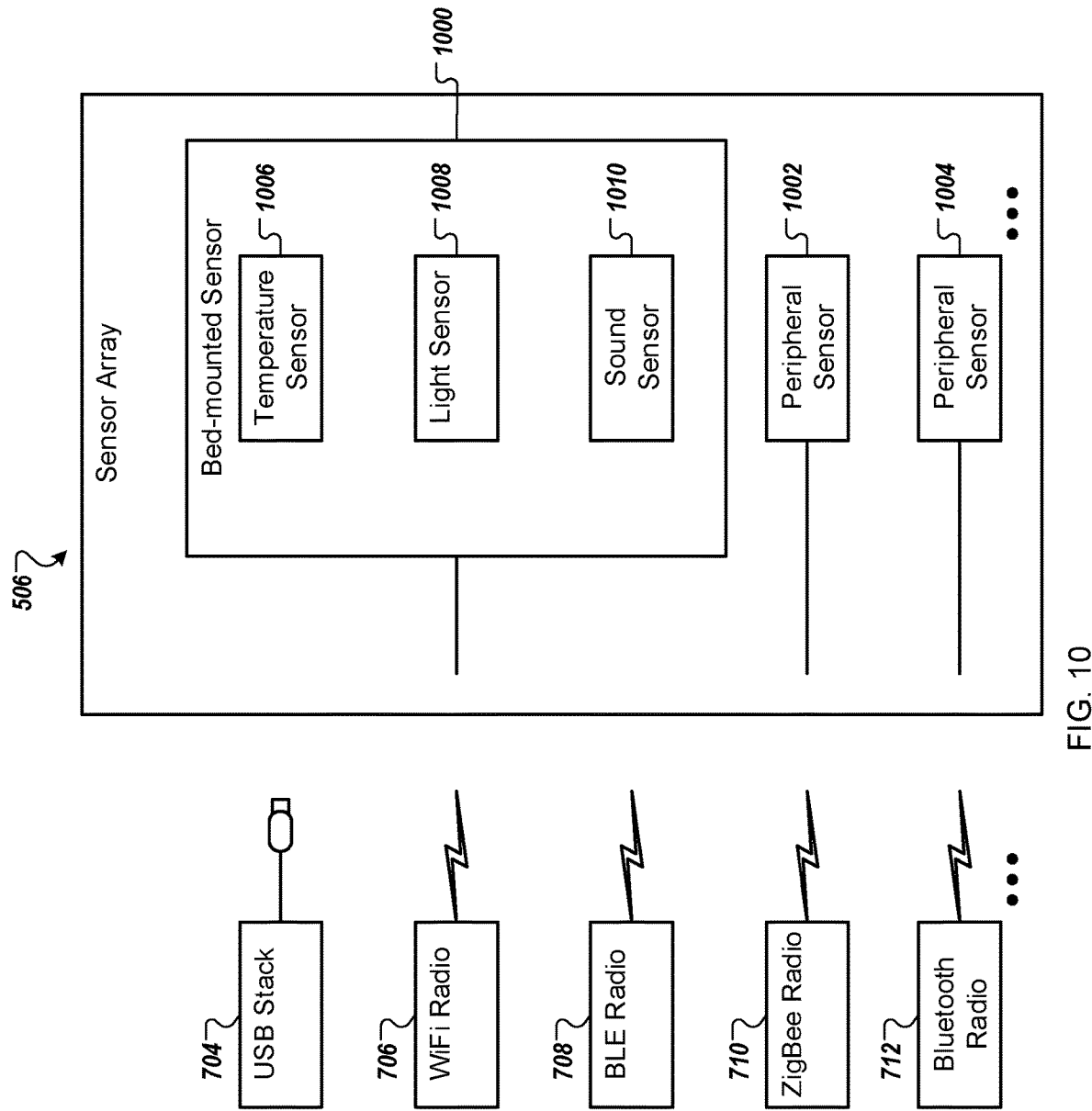
FIG. 10 is a block diagram of an example of a sensory array that can be used in a data processing system that can be associated with a bed.

FIG. 10 is a block diagram of an example of a sensory array 506 that can be used in a data processing system that can be associated with a bed system, including those described above with respect to FIGS. 1-4E. In general, the sensor array 506 is a conceptual grouping of some or all the peripheral sensors that communicate with the motherboard 502 but are not native to the motherboard 502.

The peripheral sensors of the sensor array 506 can communicate with the motherboard 502 through one or more of the network interfaces of the motherboard, including but not limited to the USB stack 704, the WiFi radio 706, the Bluetooth Low Energy (BLE) radio 708, the ZigBee radio 710, and the Bluetooth radio 712, as is appropriate for the configuration of the particular sensor. For example, a sensor that outputs a reading over a USB cable can communicate through the USB stack 704.

Some of the peripheral sensors 1000 of the sensor array 506 can be bed mounted. These sensors can be, for example, embedded into the structure of a bed and sold with the bed, or later affixed to the structure of the bed. Other peripheral sensors 1002 and 1004 can be in communication with the motherboard 502, but optionally not mounted to the bed. In some cases, some or all of the bed mounted sensors 1000 and/or peripheral sensors 1002 and 1004 can share networking hardware, including a conduit that contains wires from each sensor, a multi-wire cable or plug that, when affixed to the motherboard 502, connect all of the associated sensors with the motherboard 502. In some embodiments, one, some, or all of sensors 1002, 1004, 1006, 1008, and 1010 can sense one or more features of a mattress, such as pressure, temperature, light, sound, and/or one or more other features of the mattress. In some embodiments, one, some, or all of sensors 1002, 1004, 1006, 1008, and 1010 can sense one or more features external to the mattress. In some embodiments, pressure sensor 1002 can sense pressure of the mattress while some or all of sensors 1002, 1004, 1006, 1008, and 1010 can sense one or more features of the mattress and/or external to the mattress.

Figure 11:
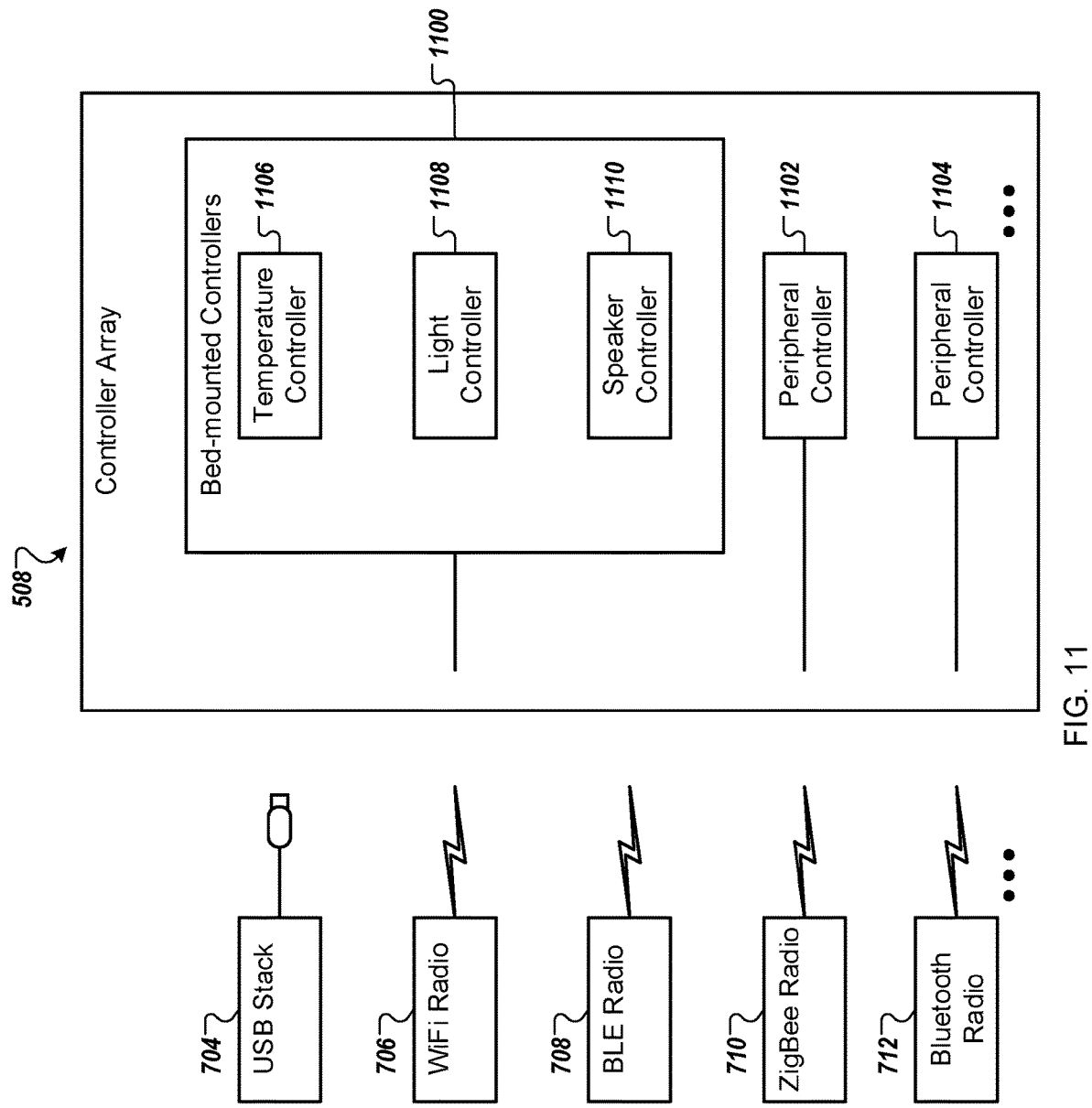
FIG. 11 is a block diagram of an example of a control array that can be used in a data processing system that can be associated with a bed

FIG. 11 is a block diagram of an example of a controller array 508 that can be used in a data processing system that can be associated with a bed system, including those described above with respect to FIGS. 1-4E. In general, the controller array 508 is a conceptual grouping of some or all peripheral controllers that communicate with the motherboard 502 but are not native to the motherboard 502.

The peripheral controllers of the controller array 508 can communicate with the motherboard 502 through one or more of the network interfaces of the motherboard, including but not limited to the USB stack 704, the WiFi radio 706, the Bluetooth Low Energy (BLE) radio 708, the ZigBee radio 710, and the Bluetooth radio 712, as is appropriate for the configuration of the particular sensor. For example, a controller that receives a command over a USB cable can communicate through the USB stack 704.

Some of the controllers of the controller array 508 can be bed mounted 1100. These controllers can be, for example, embedded into the structure of a bed and sold with the bed, or later affixed to the structure of the bed. Other peripheral controllers 1102 and 1104 can be in communication with the motherboard 502, but optionally not mounted to the bed. In some cases, some or all of the bed mounted controllers 1100 and/or peripheral controllers 1102 and 1104 can share networking hardware, including a conduit that contains wires for each controller, a multi-wire cable or plug that, when affixed to the motherboard 502, connects all of the associated controllers with the motherboard 502.

Figure 12:
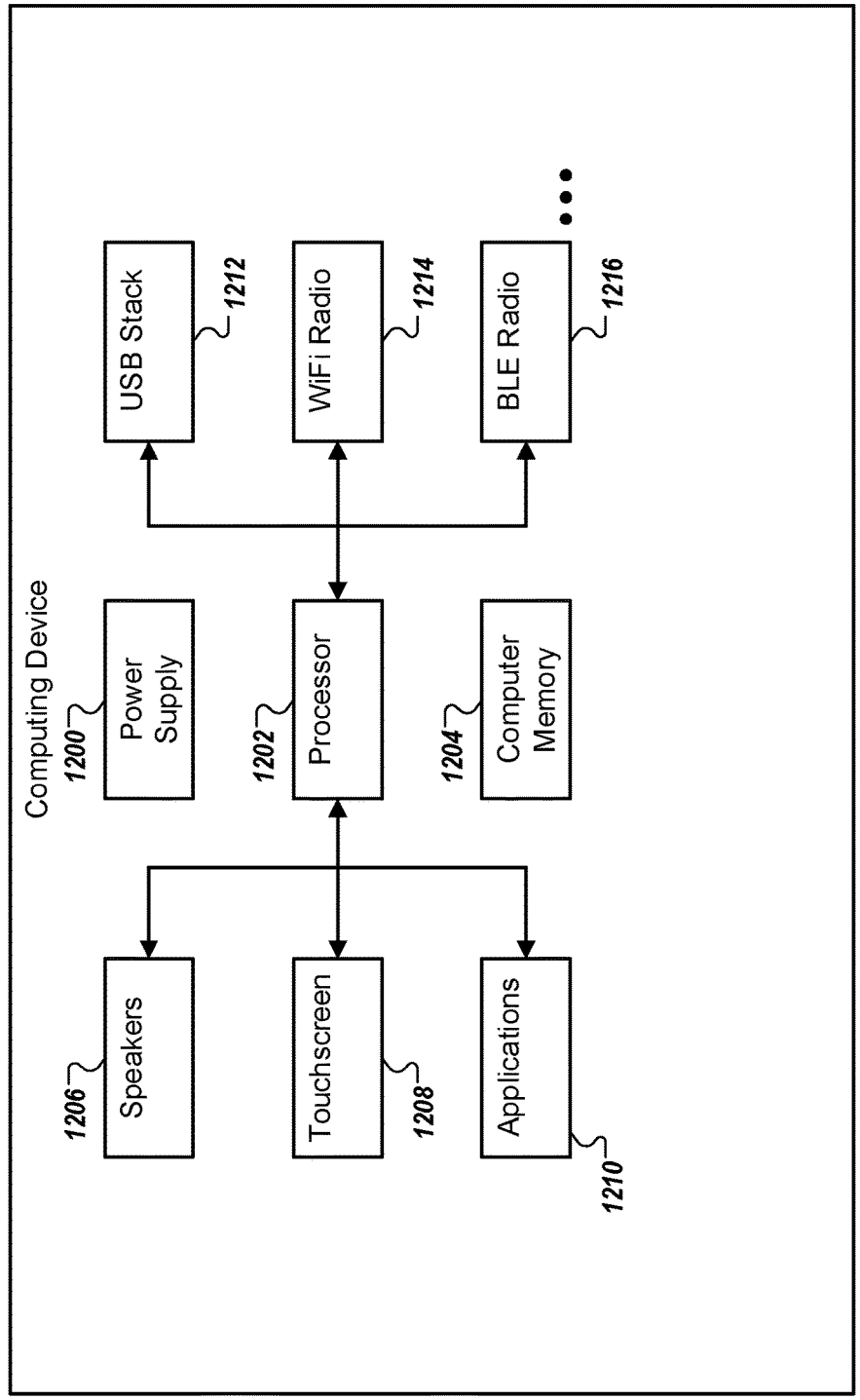
FIG. 12 is a block diagram of an example of a computing device that can be used in a data processing system that can be associated with a bed.

FIG. 12 is a block diagram of an example of a computing device 512 that can be used in a data processing system that can be associated with a bed system, including those described above with respect to FIGS. 1-4E. The computing device 512 can include, for example, computing devices used by a user of a bed. Example computing devices 512 include, but are not limited to, mobile computing devices (e.g., mobile phones, tablet computers, laptops) and desktop computers.

The computing device 512 includes a power supply 1200, a processor 1202, and computer readable memory 1204. User input and output can be transmitted by, for example, speakers 1206, a touchscreen 1208, or other not shown components such as a pointing device or keyboard. The computing device 512 can run one or more applications 1210. These applications can include, for example, application to allow the user to interact with the system 500. These applications can allow a user to view information about the bed (e.g., sensor readings, sleep metrics), or configure the behavior of the system 500 (e.g., set a desired firmness to the bed, set desired behavior for peripheral devices). In some cases, the computing device 512 can be used in addition to, or to replace, the remote control 122 described previously.

Figure 13:
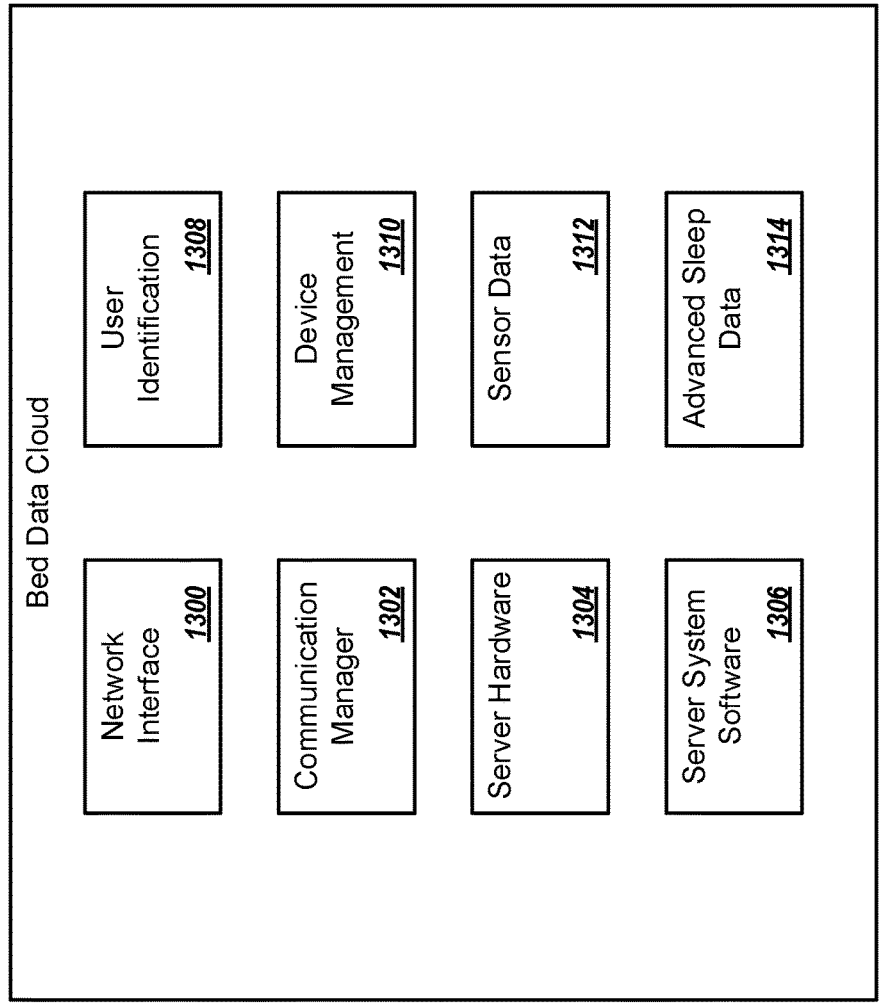
FIGS. 13-17 are block diagrams of example cloud services that can be used in a data processing system that can be associated with a bed.

FIG. 13 is a block diagram of an example bed data cloud service 510a that can be used in a data processing system that can be associated with a bed system, including those described above with respect to FIGS. 1-4E. In this example, the bed data cloud service 510a is configured to collect sensor data and sleep data from a particular bed, and to match the sensor and sleep data with one or more users that use the bed when the sensor and sleep data was generated.

The bed data cloud service 510a is shown with a network interface 1300, a communication manager 1302, server hardware 1304, and server system software 1306. In addition, the bed data cloud service 510a is shown with a user identification module 1308, a device management 1310 module, a sensor data module 1310, and an advanced sleep data module 1314.

The network interface 1300 generally includes hardware and low level software used to allow one or more hardware devices to communicate over networks. For example the network interface 1300 can include network cards, routers, modems, and other hardware needed to allow the components of the bed data cloud service 410a to communicate with each other and other destinations over, for example, the Internet 512. The communication manger 1302 generally comprises hardware and software that operate above the network interface 1300. This includes software to initiate, maintain, and tear down network communications used by the bed data cloud service 510a. This includes, for example, TCP/IP, SSL or TLS, Torrent, and other communication sessions over local or wide area networks. The communication manger 1302 can also provide load balancing and other services to other elements of the bed data cloud service 510a.

The server hardware 1304 generally includes the physical processing devices used to instantiate and maintain bed data cloud service 510a. This hardware includes, but is not limited to processors (e.g., central processing units, ASICs, graphical processors), and computer readable memory (e.g., random access memory, stable hard disks, tape backup). One or more servers can be configured into clusters, multicomputer, or datacenters that can be geographically separate or connected.

The server system software 1306 generally includes software that runs on the server hardware 1304 to provide operating environments to applications and services. The server system software 1306 can include operating systems running on real servers, virtual machines instantiated on real servers to create many virtual servers, server level operations such as data migration, redundancy, and backup.

The user identification 1308 can include, or reference, data related to users of beds with associated data processing systems. For example, the users can include customers, owners, or other users registered with the bed data cloud service 510a or another service. Each user can have, for example, a unique identifier, user credentials, contact information, billing information, demographic information, or any other technologically appropriate information.

The device manager 1310 can include, or reference, data related to beds or other products associated with data processing systems. For example, the beds can include products sold or registered with a system associated with the bed data cloud service 510a. Each bed can have, for example, a unique identifier, model and/or serial number, sales information, geographic information, delivery information, a listing of associated sensors and control peripherals, etc. Additionally, an index or indexes stored by the bed data cloud service 510a can identify users that are associated with beds. For example, this index can record sales of a bed to a user, users that sleep in a bed, etc.

The sensor data 1212 can record raw or condensed sensor data recorded by beds with associated data processing systems. For example, a bed's data processing system can have a temperature sensor, pressure sensor, and light sensor. Readings from these sensors, either in raw form or in a format generated from the raw data (e.g. sleep metrics) of the sensors, can be communicated by the bed's data processing system to the bed data cloud service 510a for storage in the sensor data 1312. Additionally, an index or indexes stored by the bed data cloud service 510a can identify users and/or beds that are associated with the sensor data 1312.

The bed data cloud service 510a can use any of its available data to generate advanced sleep data 1314. In general, the advanced sleep data 1314 includes sleep metrics and other data generated from sensor readings. Some of these calculations can be performed in the bed data cloud service 510a instead of locally on the bed's data processing system, for example, because the calculations are computationally complex or require a large amount of memory space or processor power that is not available on the bed's data processing system. This can help allow a bed system to operate with a relatively simple controller and still be part of a system that performs relatively complex tasks and computations.

Figure 14:
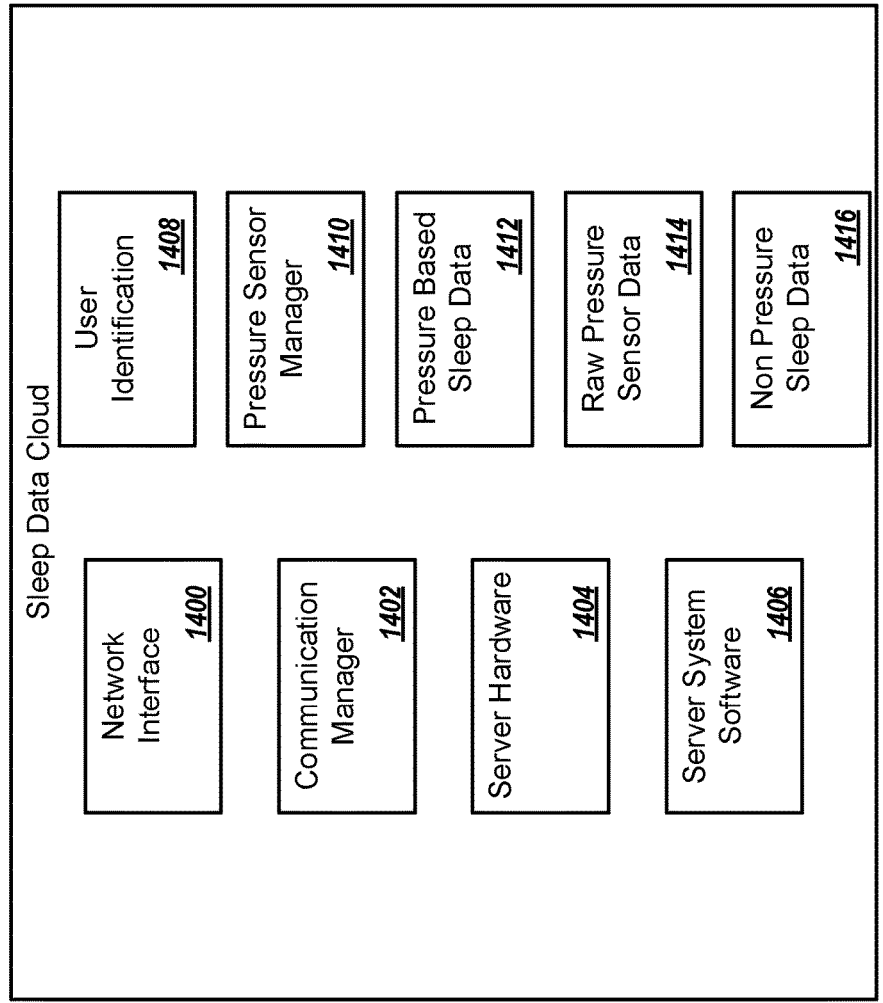

FIG. 14 is a block diagram of an example sleep data cloud service 510b that can be used in a data processing system that can be associated with a bed system, including those described above with respect to FIGS. 1-4E. In this example, the sleep data cloud service 510b is configured to record data related to users' sleep experience.

The sleep data cloud service 510b is shown with a network interface 1400, a communication manager 1402, server hardware 1404, and server system software 1406. In addition, the sleep data cloud service 510b is shown with a user identification module 1408, a pressure sensor manager 1410, a pressure based sleep data module 1412, a raw pressure sensor data module 1414, and a non-pressure sleep data module 1416.

The pressure sensor manager 1410 can include, or reference, data related to the configuration and operation of pressure sensors in beds. For example, this data can include an identifier of the types of sensors in a particular bed, their settings and calibration data, etc.

The pressure based sleep data 1412 can use raw pressure sensor data 1414 to calculate sleep metrics specifically tied to pressure sensor data. For example, user presence, movements, weight change, heart rate, and breathing rate can all be determined from raw pressure sensor data 1414. Additionally, an index or indexes stored by the sleep data cloud service 510b can identify users that are associated with pressure sensors, raw pressure sensor data, and/or pressure based sleep data.

The non-pressure sleep data 1416 can use other sources of data to calculate sleep metrics. For example, user entered preferences, light sensor readings, and sound sensor readings can all be used to track sleep data. Additionally, an index or indexes stored by the sleep data cloud service 510b can identify users that are associated with other sensors and/or non-pressure sleep data 1416.

Figure 15:
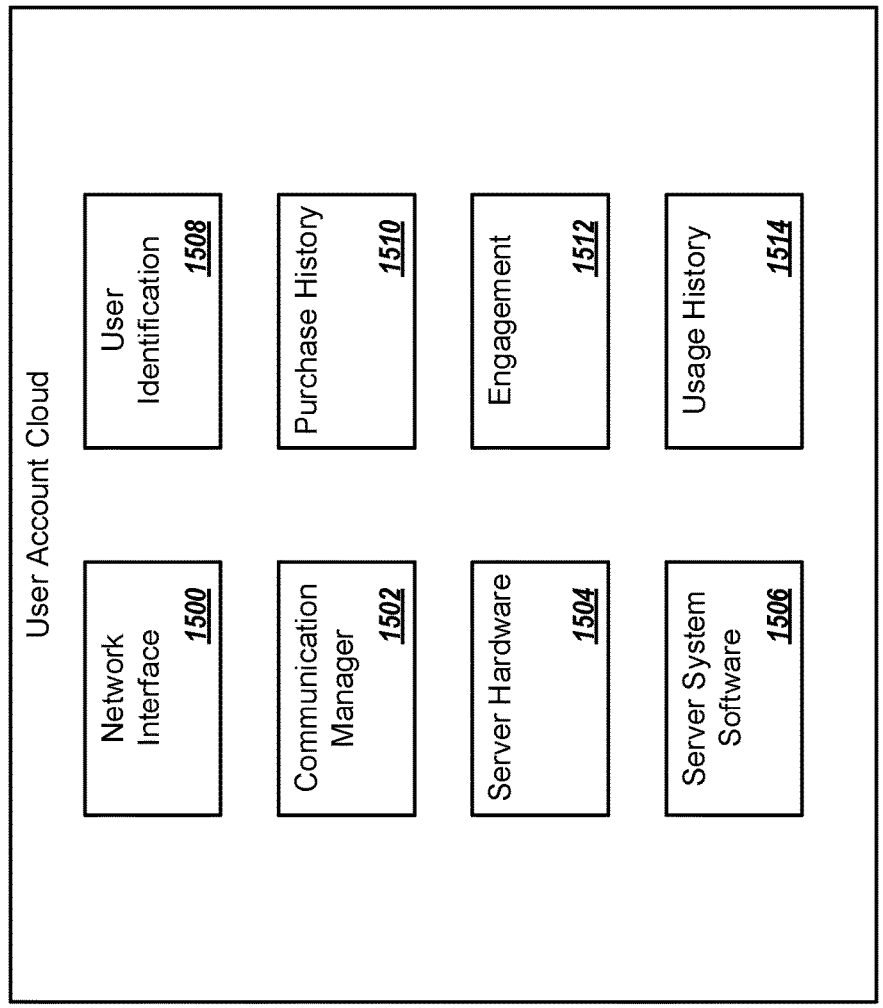

FIG. 15 is a block diagram of an example user account cloud service 410c that can be used in a data processing system that can be associated with a bed system, including those described above with respect to FIGS. 1-4E. In this example, the user account cloud service 510c is configured to record a list of users and to identify other data related to those users.

The user account cloud service 510c is shown with a network interface 1500, a communication manager 1502, server hardware 1504, and server system software 1506. In addition, the user account cloud service 510c is shown with a user identification module 1508, a purchase history module 1510, an engagement module 1512, and an application usage history module 1514.

The user identification module 1508 can include, or reference, data related to users of beds with associated data processing systems. For example, the users can include customers, owners, or other users registered with the user account cloud service 510a or another service. Each user can have, for example, a unique identifier, and user credentials, demographic information, or any other technologically appropriate information.

The purchase history module 1510 can include, or reference, data related to purchases by users. For example, the purchase data can include a sale's contact information, billing information, and salesperson information. Additionally, an index or indexes stored by the user account cloud service 510c can identify users that are associated with a purchase.

The engagement 1512 can track user interactions with the manufacturer, vendor, and/or manager of the bed and or cloud services. This engagement data can include communications (e.g., emails, service calls), data from sales (e.g., sales receipts, configuration logs), and social network interactions.

The usage history module 1514 can contain data about user interactions with one or more applications and/or remote controls of a bed. For example, a monitoring and configuration application can be distributed to run on, for example, computing devices 512. This application can log and report user interactions for storage in the application usage history module 1514. Additionally, an index or indexes stored by the user account cloud service 510c can identify users that are associated with each log entry.

Figure 16:
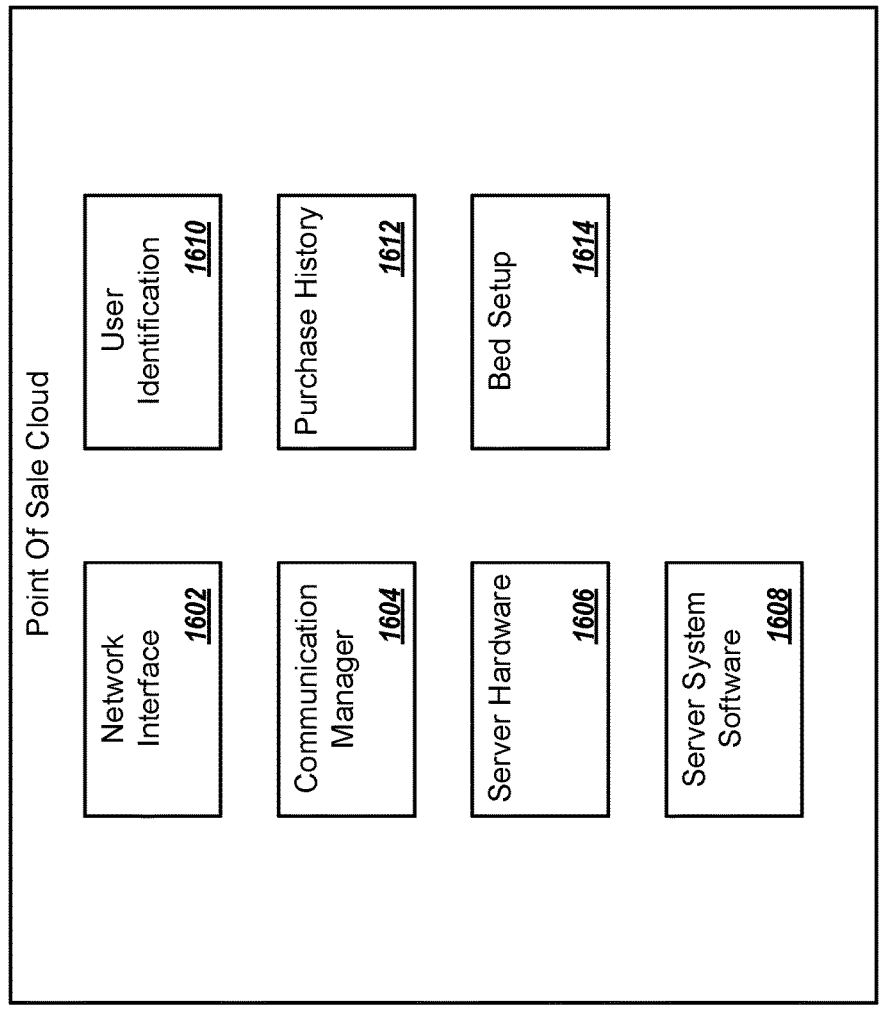

FIG. 16 is a block diagram of an example point of sale cloud service 1600 that can be used in a data processing system that can be associated with a bed system, including those described above with respect to FIGS. 1-4E. In this example, the point of sale cloud service 1600 is configured to record data related to users' purchases.

The point of sale cloud service 1600 is shown with a network interface 1602, a communication manager 1604, server hardware 1606, and server system software 1608. In addition, the point of sale cloud service 1600 is shown with a user identification module 1610, a purchase history module 1612, and a setup module 1614.

The purchase history module 1612 can include, or reference, data related to purchases made by users identified in the user identification module 1610. The purchase information can include, for example, data of a sale, price, and location of sale, delivery address, and configuration options selected by the users at the time of sale. These configuration options can include selections made by the user about how they wish their newly purchased beds to be setup and can include, for example, expected sleep schedule, a listing of peripheral sensors and controllers that they have or will install, etc.

The bed setup module 1614 can include, or reference, data related to installations of beds that users' purchase. The bed setup data can include, for example, the date and address to which a bed is delivered, the person that accepts delivery, the configuration that is applied to the bed upon delivery, the name or names of the person or people who will sleep on the bed, which side of the bed each person will use, etc.

Data recorded in the point of sale cloud service 1600 can be referenced by a user's bed system at later dates to control functionality of the bed system and/or to send control signals to peripheral components according to data recorded in the point of sale cloud service 1600. This can allow a salesperson to collect information from the user at the point of sale that later facilitates automation of the bed system. In some examples, some or all aspects of the bed system can be automated with little or no user-entered data required after the point of sale. In other examples, data recorded in the point of sale cloud service 1600 can be used in connection with a variety of additional data gathered from user-entered data.

Figure 17:
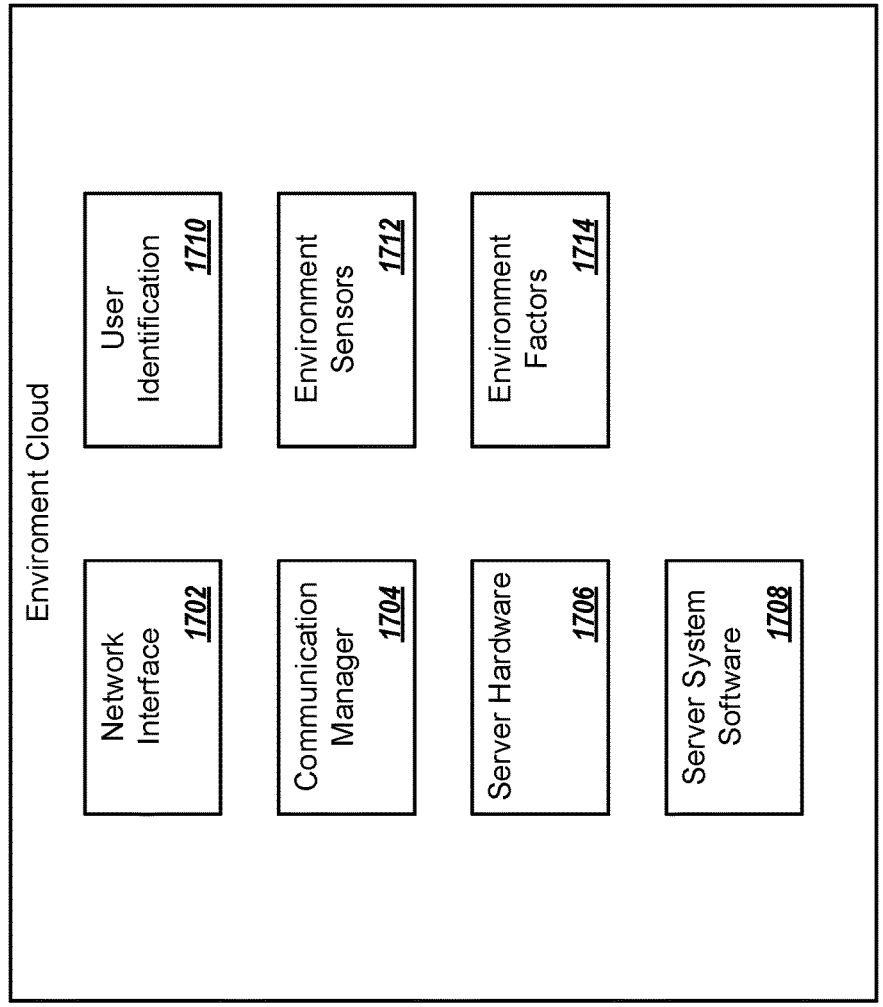

FIG. 17 is a block diagram of an example environment cloud service 1700 that can be used in a data processing system that can be associated with a bed system, including those described above with respect to FIGS. 1-4E. In this example, the environment cloud service 1700 is configured to record data related to users' home environment.

The environment cloud service 1700 is shown with a network interface 1702, a communication manager 1704, server hardware 1706, and server system software 1708. In addition, the environment cloud service 1700 is shown with a user identification module 1710, an environmental sensor module 1712, and an environmental factors module 1714.

The environmental sensors module 1712 can include a listing of sensors that users' in the user identification module 1710 have installed in their bed. These sensors include any sensors that can detect environmental variables—light sensors, noise sensors, vibration sensors, thermostats, etc. Additionally, the environmental sensors module 1712 can store historical readings or reports from those sensors.

The environmental factors module 1714 can include reports generated based on data in the environmental sensors module 1712. For example, for a user with a light sensor with data in the environment sensors module 1712, the environmental factors module 1714 can hold a report indicating the frequency and duration of instances of increased lighting when the user is asleep.

In the examples discussed here, each cloud service 510 is shown with some of the same components. In various configurations, these same components can be partially or wholly shared between services, or they can be separate. In some configurations, each service can have separate copies of some or all of the components that are the same or different in some ways. Additionally, these components are only supplied as illustrative examples. In other examples each cloud service can have different number, types, and styles of components that are technically possible.

Figure 18:
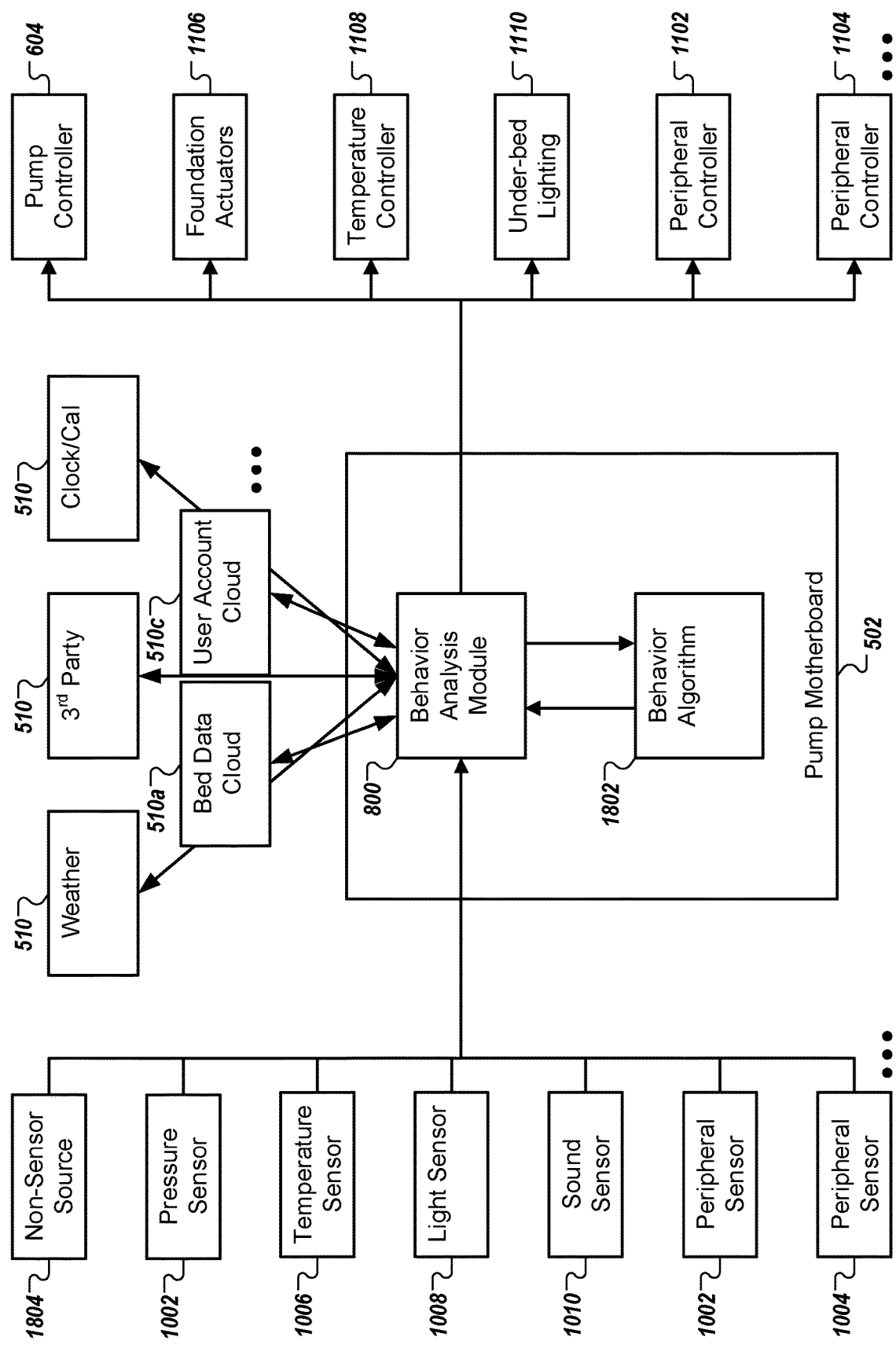
FIG. 18 is a block diagram of an example of using a data processing system that can be associated with a bed to automate peripherals around the bed.

FIG. 18 is a block diagram of an example of using a data processing system that can be associated with a bed (such as a bed of the bed systems described herein) to automate peripherals around the bed. Shown here is a behavior analysis module 1800 that runs on the pump motherboard 502. For example, the behavior analysis module 1800 can be one or more software components stored on the computer memory 612 and executed by the processor 602. In general, the behavior analysis module 1800 can collect data from a wide variety of sources (e.g., sensors, non-sensor local sources, cloud data services) and use a behavioral algorithm 1802 to generate one or more actions to be taken (e.g., commands to send to peripheral controllers, data to send to cloud services). This can be useful, for example, in tracking user behavior and automating devices in communication with the user's bed.

The behavior analysis module 1800 can collect data from any technologically appropriate source, for example, to gather data about features of a bed, the bed's environment, and/or the bed's users. Some such sources include any of the sensors of the sensor array 506. For example, this data can provide the behavior analysis module 1800 with information about the current state of the environment around the bed. For example, the behavior analysis module 1800 can access readings from the pressure sensor 1002 to determine the pressure of an air chamber in the bed. From this reading, and potentially other data, user presence in the bed can be determined. In another example, the behavior analysis module can access a light sensor 1008 to detect the amount of light in the bed's environment.

Similarly, the behavior analysis module 1800 can access data from cloud services. For example, the behavior analysis module 1800 can access the bed cloud service 510a to access historical sensor data 1312 and/or advanced sleep data 1314. Other cloud services 510, including those not previously described can be accessed by the behavior analysis module 1800. For example, the behavior analysis module 1800 can access a weather reporting service, a $3^{rd}$ party data provider (e.g., traffic and news data, emergency broadcast data, user travel data), and/or a clock and calendar service.

Similarly, the behavior analysis module 1800 can access data from non-sensor sources 1804. For example, the behavior analysis module 1800 can access a local clock and calendar service (e.g., a component of the motherboard 502 or of the processor 602).

The behavior analysis module 1800 can aggregate and prepare this data for use by one or more behavioral algorithms 1802. The behavioral algorithms 1802 can be used to learn a user's behavior and/or to perform some action based on the state of the accessed data and/or the predicted user behavior. For example, the behavior algorithm 1802 can use available data (e.g., pressure sensor, non-sensor data, clock and calendar data) to create a model of when a user goes to bed every night. Later, the same or a different behavioral algorithm 1802 can be used to determine if an increase in air chamber pressure is likely to indicate a user going to bed and, if so, send some data to a third-party cloud service 510 and/or engage a peripheral controller 1102.

In the example shown, the behavioral analysis module 1800 and the behavioral algorithm 1802 are shown as components of the motherboard 502. However, other configurations are possible. For example, the same or a similar behavioral analysis module and/or behavior algorithm can be run in one or more cloud services, and the resulting output can be sent to the motherboard 502, a controller in the controller array 508, or to any other technologically appropriate recipient.

Figure 19:
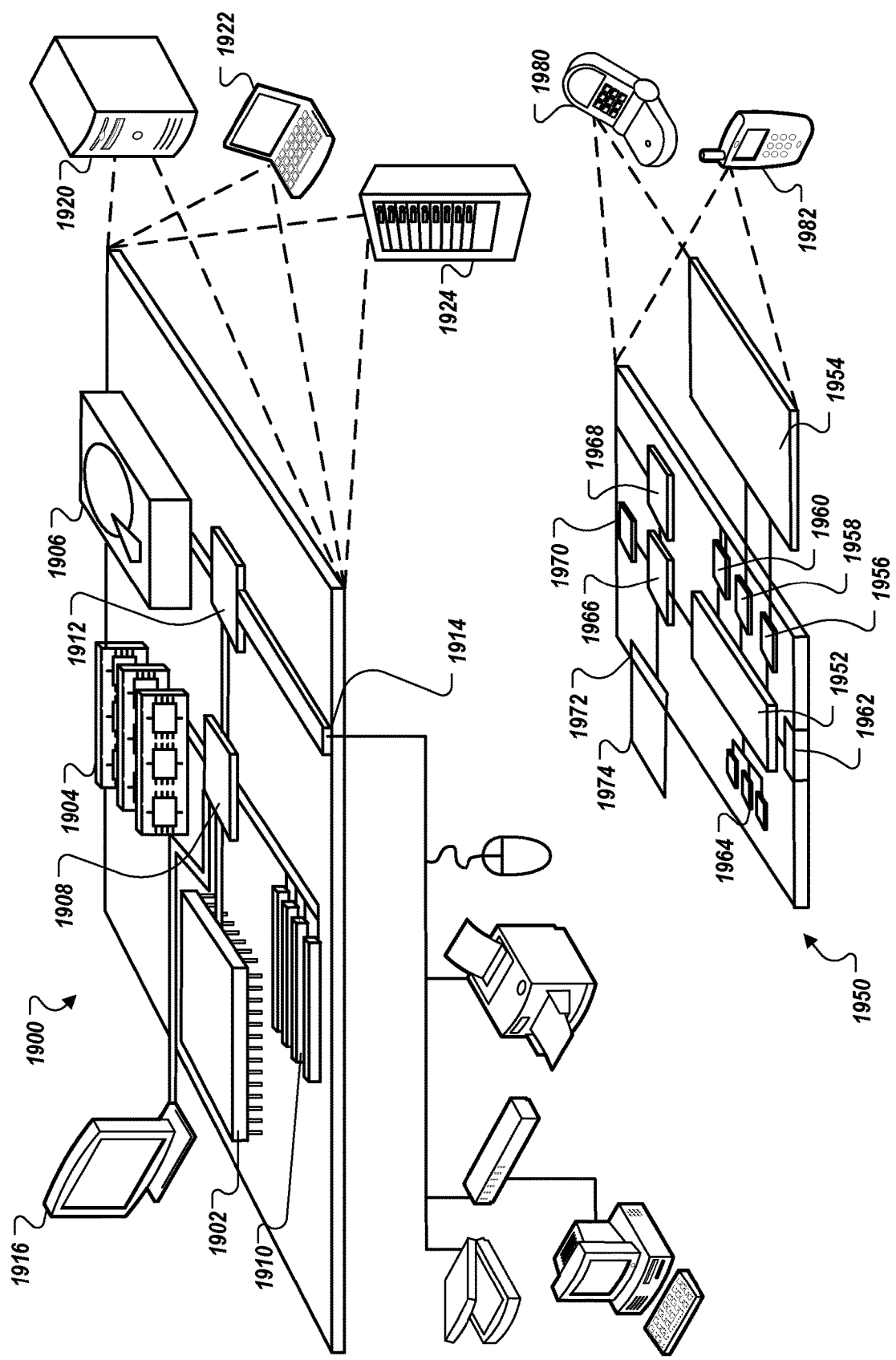
FIG. 19 is a schematic diagram that shows an example of a computing device and a mobile computing device.
Figure 20:
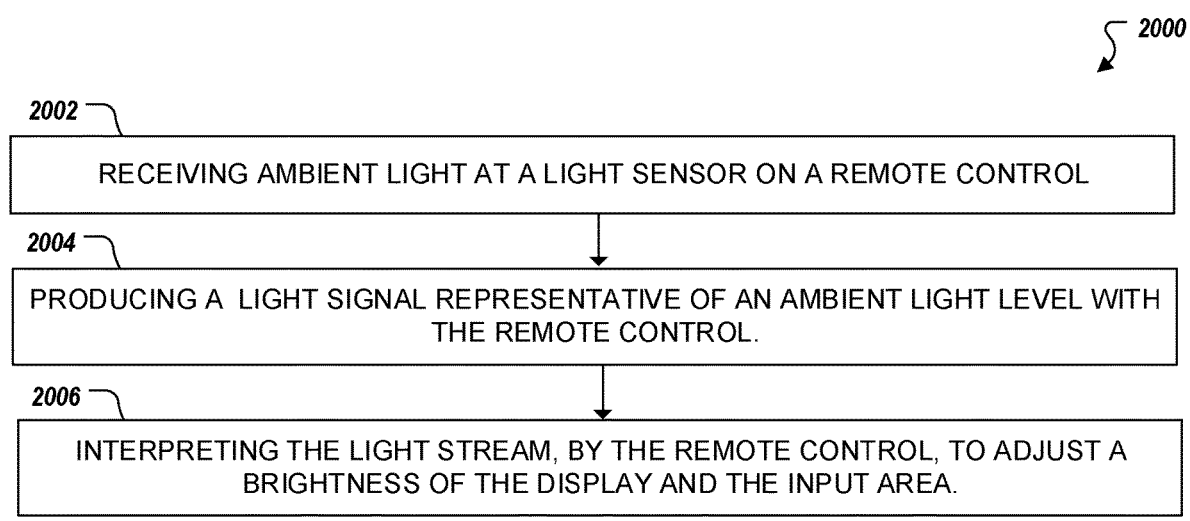
FIG. 20 is a flow chart of an example method of operating the light sensor of the remote control.

FIG. 19 shows an example of a computing device 1900 and an example of a mobile computing device that can be used to implement the techniques described here. The computing device 1900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1900 includes a processor 1902, a memory 1904, a storage device 1906, a high-speed interface 1908 connecting to the memory 1904 and multiple high-speed expansion ports 1910, and a low-speed interface 1912 connecting to a low-speed expansion port 1914 and the storage device 1906. Each of the processor 1902, the memory 1904, the storage device 1906, the high-speed interface 1908, the high-speed expansion ports 1910, and the low-speed interface 1912, are interconnected using various buses, and can be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as a display 1916 coupled to the high-speed interface 1908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1904 stores information within the computing device 1900. In some implementations, the memory 1904 is a volatile memory unit or units. In some implementations, the memory 1904 is a non-volatile memory unit or units. The memory 1904 can also be another form of computer-readable medium, such as a magnetic or optical disk.

The storage device 1906 is capable of providing mass storage for the computing device 1900. In some implementations, the storage device 1906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1904, the storage device 1906, or memory on the processor 1902.

The high-speed interface 1908 manages bandwidth-intensive operations for the computing device 1900, while the low-speed interface 1912 manages lower bandwidth-intensive operations. Such allocation of functions is exemplary only. In some implementations, the high-speed interface 1908 is coupled to the memory 1904, the display 1916 (e.g., through a graphics processor or accelerator), and to the high-speed expansion ports 1910, which can accept various expansion cards (not shown). In the implementation, the low-speed interface 1912 is coupled to the storage device 1906 and the low-speed expansion port 1914. The low-speed expansion port 1914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1900 can be implemented in a number of different forms, as shown in the figure. For example, it can be implemented as a standard server 1920, or multiple times in a group of such servers. In addition, it can be implemented in a personal computer such as a laptop computer 1922. It can also be implemented as part of a rack server system 1924. Alternatively, components from the computing device 1900 can be combined with other components in a mobile device (not shown), such as a mobile computing device 1950. Each of such devices can contain one or more of the computing device 1900 and the mobile computing device 1950, and an entire system can be made up of multiple computing devices communicating with each other.

The mobile computing device 1950 includes a processor 1952, a memory 1964, an input/output device such as a display 1954, a communication interface 1966, and a transceiver 1968, among other components. The mobile computing device 1950 can also be provided with a storage device, such as a micro-drive or other device, to provide additional storage. Each of the processor 1952, the memory 1964, the display 1954, the communication interface 1966, and the transceiver 1968, are interconnected using various buses, and several of the components can be mounted on a common motherboard or in other manners as appropriate.

The processor 1952 can execute instructions within the mobile computing device 1950, including instructions stored in the memory 1964. The processor 1952 can be implemented as a chip set of chips that include separate and multiple analog and digital processors. The processor 1952 can provide, for example, for coordination of the other components of the mobile computing device 1950, such as control of user interfaces, applications run by the mobile computing device 1950, and wireless communication by the mobile computing device 1950.

The processor 1952 can communicate with a user through a control interface 1958 and a display interface 1956 coupled to the display 1954. The display 1954 can be, for example, a TFT (Thin-Film-Transistor Liquid Crystal Display) display or an OLED (Organic Light Emitting Diode) display, or other appropriate display technology. The display interface 1956 can comprise appropriate circuitry for driving the display 1954 to present graphical and other information to a user. The control interface 1958 can receive commands from a user and convert them for submission to the processor 1952. In addition, an external interface 1962 can provide communication with the processor 1952, so as to enable near area communication of the mobile computing device 1950 with other devices. The external interface 1962 can provide, for example, for wired communication in some implementations, or for wireless communication in other implementations, and multiple interfaces can also be used.

The memory 1964 stores information within the mobile computing device 1950. The memory 1964 can be implemented as one or more of a computer-readable medium or media, a volatile memory unit or units, or a non-volatile memory unit or units. An expansion memory 1974 can also be provided and connected to the mobile computing device 1950 through an expansion interface 1972, which can include, for example, a SIMM (Single In Line Memory Module) card interface. The expansion memory 1974 can provide extra storage space for the mobile computing device 1950, or can also store applications or other information for the mobile computing device 1950. Specifically, the expansion memory 1974 can include instructions to carry out or supplement the processes described above, and can include secure information also. Thus, for example, the expansion memory 1974 can be provide as a security module for the mobile computing device 1950, and can be programmed with instructions that permit secure use of the mobile computing device 1950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1964, the expansion memory 1974, or memory on the processor 1952. In some implementations, the computer program product can be received in a propagated signal, for example, over the transceiver 1968 or the external interface 1962.

The mobile computing device 1950 can communicate wirelessly through the communication interface 1966, which can include digital signal processing circuitry where necessary. The communication interface 1966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1968 using a radio-frequency. In addition, short-range communication can occur, such as using a Bluetooth, WiFi, or other such transceiver (not shown). In addition, a GPS (Global Positioning System) receiver module 1970 can provide additional navigation- and location-related wireless data to the mobile computing device 1950, which can be used as appropriate by applications running on the mobile computing device 1950.

The mobile computing device 1950 can also communicate audibly using an audio codec 1960, which can receive spoken information from a user and convert it to usable digital information. The audio codec 1960 can likewise generate audible sound for a user, such as through a speaker, e.g., in a handset of the mobile computing device 1950. Such sound can include sound from voice telephone calls, can include recorded sound (e.g., voice messages, music files, etc.) and can also include sound generated by applications operating on the mobile computing device 1950.

The mobile computing device 1950 can be implemented in a number of different forms, as shown in the figure. For example, it can be implemented as a cellular telephone 1980. It can also be implemented as part of a smart-phone 1982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A remote control for a bed system, the remote control comprising:
a case comprising a base surface, a display surface, an upper surface, and a portion of the case that is capacitively sensitive, the remote control being configured to wake responsive to a signal from the portion of the case that is capacitively sensitive due to a change in capacitance resulting from a user touch;
a display screen on the display surface;
a first input area on the display surface;
at least one capacitive button separate from the first input area and the display screen; and
a communication module configured to allow communication between the remote control and a separate controller of the bed system.

2. The remote control of claim 1, wherein a portion of the case is metallic.

3. The remote control of claim 1, wherein the first input area comprises a direction pad and a selection pad.

4. The remote control of claim 1, wherein the upper surface is a different surface than the display surface and is angled with respect to the display surface, and further comprising a slider switch on the upper surface, the slider switch configured to toggle between a first position and a second position.

5. The remote control of claim 1, wherein the remote control is wirelessly coupled to the separate controller.

6. The remote control of claim 1, wherein the separate controller is a bed controller configured to control pressure, articulation, temperature, or light level of the bed system.

7. The remote control of claim 1, wherein the remote control is configured to:
ping the separate controller upon waking,
receive a state from the separate controller responsive to the ping, and
display an interface on the display screen responsive to the received state.

8. The remote control of claim 1, wherein the capacitive button is between the display screen and the first input area.

9. The remote control of claim 1, wherein the base surface is sized to allow the remote control to rest in a vertical position with the base surface positioned opposite the upper surface.

10. The remote control of claim 1, wherein the base surface is substantially triangular and the upper surface is a rounded rectangle.

11. The remote control of claim 1, further comprising a light sensor configured to:
receive ambient light, and
produce a light signal representative of an ambient light level.

12. The remote control of claim 11, wherein the remote control is configured to adjust a brightness of the display screen or the first input area responsive to the light signal.

13. A remote control for a bed system, the remote control comprising:
a case comprising a base surface, a display surface, and an upper surface;
a display screen on the display surface;
a first input area on the display surface;
at least one capacitive button separate from the first input area and the display screen;
a slider switch, the slider switch configured to toggle between a first position and a second position, wherein the slider switch adjusts an interface displayed on the display screen to control a first side of a bed when the slider switch is in the first position and adjusts the interface displayed on the display to control a second side of the bed when the slider switch is in the second position.

14. A bed control system comprising:
a bed controller configured to control functions of a bed;
a remote control physically separate from the bed controller, wherein the remote control is wirelessly coupled to the bed controller, the remote control comprising:
a case comprising a base surface, a display surface, and an upper surface, wherein a portion of the case separate from the display surface is capacitively sensitive,
a display screen on the display surface, and
an input area on the display surface,
the remote control configured to:

wake responsive to a signal from the case of the remote control due to a change in capacitance resulting from a user touch on the case of the remote control, ping the bed controller upon waking, receive a state from the bed controller responsive to the ping, and display an interface on the display screen responsive to the received state.

15. The bed control system of claim 14, wherein the capacitive button is between the display screen and the input area.

16. The bed control system of claim 14, wherein the upper surface is positioned opposite of the base surface, and further comprising a slider switch on the upper surface configured to toggle between a first position and a second position.

17. The bed control system of claim 14, wherein the base surface of the remote control is sized to allow the remote control to rest in a vertical position.

18. The bed control system of claim 14, wherein the base surface of the remote control is substantially triangular, wherein the upper surface of the remote control is not substantially triangular, and wherein the remote control tapers from the base surface to the upper surface.

19. The bed control system of claim 14, wherein the remote control further comprises a light sensor configured to:

receive ambient light, and produce a light signal representative of an ambient light level.

20. The bed control system of claim 19, wherein the bed controller is configured to adjust a brightness of the display screen and the input area responsive to the light signal.

* * * * *